US010229483B2

(12) United States Patent
Doba et al.

(10) Patent No.: US 10,229,483 B2
(45) Date of Patent: Mar. 12, 2019

(54) IMAGE PROCESSING APPARATUS AND IMAGE PROCESSING METHOD FOR SETTING AN ILLUMINATION ENVIRONMENT

(71) Applicant: SONY CORPORATION, Tokyo (JP)

(72) Inventors: Kentaro Doba, Tokyo (JP); Yasutaka Hirasawa, Tokyo (JP); Masaki Handa, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/127,226

(22) PCT Filed: Feb. 13, 2015

(86) PCT No.: PCT/JP2015/053947
§ 371 (c)(1),
(2) Date: Sep. 19, 2016

(87) PCT Pub. No.: WO2015/166684
PCT Pub. Date: Nov. 5, 2015

(65) Prior Publication Data
US 2017/0124689 A1 May 4, 2017

(30) Foreign Application Priority Data
Apr. 30, 2014 (JP) ................. 2014-093518

(51) Int. Cl.
*G06K 9/46* (2006.01)
*G06T 5/00* (2006.01)
(Continued)

(52) U.S. Cl.
CPC ............. *G06T 5/009* (2013.01); *G03B 15/02* (2013.01); *G06K 9/4661* (2013.01); *G06T 7/593* (2017.01);
(Continued)

(58) Field of Classification Search
None
See application file for complete search history.

(56) References Cited

U.S. PATENT DOCUMENTS

| 2011/0234758 A1* | 9/2011 | Tsuboi | ............... H04N 13/0253 348/46 |
| 2012/0027292 A1* | 2/2012 | Kozakaya | .......... G06K 9/00255 382/154 |
| 2015/0325038 A1* | 11/2015 | Baker | ................... G06T 15/205 345/426 |

FOREIGN PATENT DOCUMENTS

| CN | 102278955 A | 12/2011 |
| JP | 2003-296750 | 10/2003 |

(Continued)

OTHER PUBLICATIONS

Oct. 24, 2017, European Search Report for related EP application No. 15785695.6.

(Continued)

*Primary Examiner* — Idowu O Osifade
(74) *Attorney, Agent, or Firm* — Paratus Law Group, PLLC

(57) ABSTRACT

A subject information acquisition unit 12 acquires imaged subject information indicative of attributes related to illumination for a subject from a taken image. A preset information selection unit 21 selects preset information as illumination setting information for setting an illumination environment according to a user operation. An illumination setting information adjustment unit adjusts the illumination setting information selected by the illumination setting information selection unit to illumination setting information corresponding to the subject on the basis of the imaged subject information acquired by the subject information acquisition unit. By simply selecting the preset information, it is possible to set easily an illumination environment for relighting, for example.

20 Claims, 18 Drawing Sheets

(51) Int. Cl.

| | | |
|---|---|---|
| *G06T 7/70* | (2017.01) | |
| *G03B 15/02* | (2006.01) | |
| *G03B 35/08* | (2006.01) | |
| *G06T 15/50* | (2011.01) | |
| *G06T 7/593* | (2017.01) | |
| *H04N 5/232* | (2006.01) | |
| *H04N 5/235* | (2006.01) | |
| *H04N 13/133* | (2018.01) | |

(52) U.S. Cl.
CPC ......... *G06T 15/506* (2013.01); *H04N 5/2354* (2013.01); *H04N 5/23216* (2013.01); *G03B 35/08* (2013.01); *G06T 7/70* (2017.01); *G06T 2207/10012* (2013.01); *G06T 2207/20092* (2013.01); *H04N 13/133* (2018.05)

(56) References Cited

FOREIGN PATENT DOCUMENTS

| | | |
|---|---|---|
| JP | 2004-021388 | 1/2004 |
| JP | 2007-066012 | 3/2007 |
| JP | 2009-223906 | 10/2009 |
| JP | 2013-009082 | 1/2013 |

OTHER PUBLICATIONS

Loscos et al., Interactive Virtual Relighting of Real Scenes, IEEE Transactions on Visualization and Computer Graphics, Oct.-Dec. 2000, pp. 289-304, vol. 6, No. 4, Los Alamitos, USA.

Moughamian, Creative Lighting Effects with Adobe Photoshop CS6, Adobe Press http://www.adobepress.com/articles/article.asp?p=1860949, Apr. 23, 2012, pp. 1-10, San Francisco, USA.

Agarwala et al., Interactive Digital Photomontage, ACM Transactions on Graphics, Aug. 8-12, 2004, pp. 294-302, Los Angeles, USA.

Csakany et al., Relighting of Facial Images, 7th International Conference on Automatic Face and Gesture Recognition (FGR 2006), Apr. 10-12, 2006, pp. 55-60, Southampton, UK.

Guide to RTIViewer v1.0.2, 2010, pp. 1-25, Cultural Heritage Imaging and Visual Computing Lab, ISTI—Italian National Research Council.

Nov. 27, 2018, Japanese Office Action issued for related JP application No. 2016-515872.

Nov. 16, 2018, Chinese Office Action issued for related CN Application No. 201580021217.3.

\* cited by examiner

FIG. 7

| PRESET ELEMENT | | | IMPORTANCE DEGREE (DESCENDING ORDER) | |
|---|---|---|---|---|
| LIGHT SOURCE | NUMBER (LIGHT SOURCES) | | HIGH | |
| | | POSITION | HIGH | EXPRESSED IN UNIT m (METER) FOR EACH OF COORDINATE AXES (X, Y, Z) |
| | | DIRECTION | HIGH | STORED AS NORMALIZED VECTOR WITHOUT UNIT |
| | | INTENSITY | HIGH | EXPRESSED IN UNIT lm (LUMEN) |
| | | COLOR | HIGH | REGARDED AS VIRTUAL COLOR FILTERS WITH VALUES OF (R, G, B), 0≤R, G, B≤255 |
| | | TYPE | HIGH | INCLUDING POINT LIGHT SOURCE, SURFACE LIGHT SOURCE, SPOT LIGHT SOURCE, PARALLEL LIGHT SOURCE, HEMISPHERICAL ENVIRONMENT LIGHT SOURCE, AND THE LIKE |
| | | COLOR TEMPERATURE | LOW | TREATED AS WHITE 6500 K WHEN THERE IS NO SETTING |
| SUBJECT | SIZE | | HIGH | INDICATING RADIUS OF SPHERE CIRCUMSCRIBING SUBJECT |
| | BARYCENTER | | HIGH | INDICATING AT WHICH POINT IN PRESET COORDINATE SYSTEM BARYCENTER OF SUBJECT IS PLACED |
| | COORDINATE AXES | | HIGH | INDICATING WITH WHICH DIRECTIONS OF PRESET COORDINATE SYSTEM MAJOR THREE AXES OF SUBJECT ARE TO BE ASSOCIATED, EXPRESSED BY VECTOR QUANTITIES (X, Y, Z), (X, Y, Z), (X, Y, Z) WITHOUT UNIT |
| | MATERIAL | | LOW | USING ACTUAL MATERIAL FOR SUBJECT WHEN THERE IS NO SETTING |
| | IMAGING MODE | | LOW | USED FOR DETERMINING WHETHER IMAGING MODE IS SUITABLE FOR SUBJECT |

FIG. 9

| PRESET EXAMPLE | | | |
|---|---|---|---|
| ILLUMINATION | NUMBER | | 2 [UNITS] |
| | <ILLUMINATION 1> | POSITION | (1, 0, 1) [m] |
| | | DIRECTION | (−0.707, 0, −0.707) |
| | | INTENSITY | 3000 [lm] |
| | | COLOR | (255, 255, 255) |
| | | TYPE | SURFACE LIGHT SOURCE (0.3×0.3 [m]) |
| | | COLOR TEMPERATURE | 6500 [K] |
| | <ILLUMINATION 2> | POSITION | (−0.8, 0, 1) [METER] |
| | | DIRECTION | (0.625, 0, −0.781) |
| | | INTENSITY | 3000 [lm] |
| | | COLOR | (255, 255, 255) |
| | | TYPE | SURFACE LIGHT SOURCE (0.3×0.3 [m]) |
| | | COLOR TEMPERATURE | 6500 [K] |
| SUBJECT | SIZE | | 0.5 [m] |
| | BARYCENTER | | (0, 0, 0) [m] |
| | COORDINATE AXES | | {(1, 0, 0), (0, 1, 0), (0, 0, 1)} |
| | MATERIAL | | SKIN |
| | IMAGING MODE | | PORTRAIT |

FIG. 10
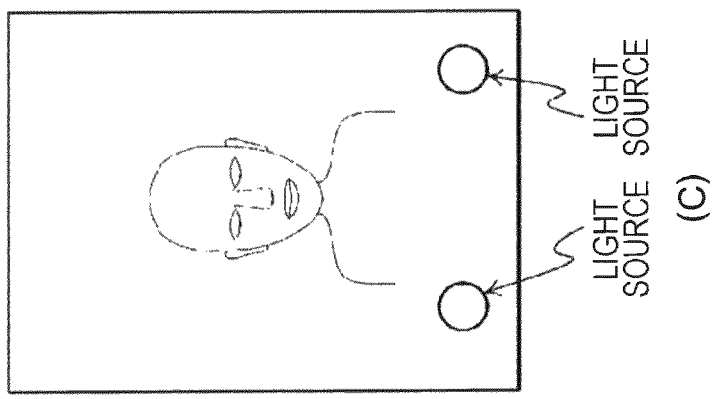
(C)
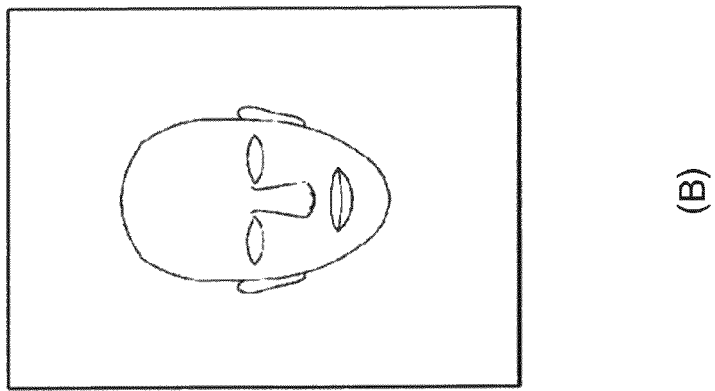
(B)
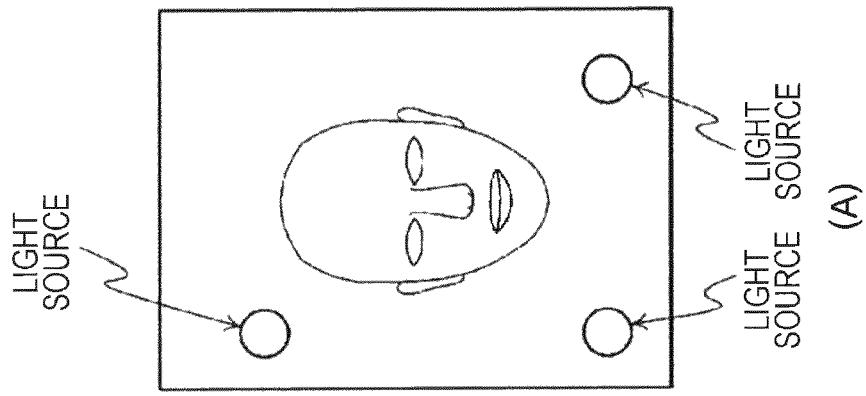
(A)

IMAGE PROCESSING APPARATUS AND IMAGE PROCESSING METHOD FOR SETTING AN ILLUMINATION ENVIRONMENT

CROSS REFERENCE TO PRIOR APPLICATION

This application is a National Stage Patent Application of PCT International Patent Application No. PCT/JP2015/053947 (filed on Feb. 13, 2015) under 35 U.S.C. § 371, which claims priority to Japanese Patent Application No. 2014-093518 (filed on Apr. 30, 2014), which are all hereby incorporated by reference in their entirety.

TECHNICAL FIELD

This technology relates to an image processing apparatus and an image processing method that facilitate setting of an illumination environment for relighting.

BACKGROUND ART

Conventionally, an image processing technology called relighting is used in image processing and others to create an illumination environment different from that in image shooting and perform again illumination and drawing processes.

Information required for relighting is roughly divided into the shape of a subject, the reflection characteristics of the subject, and the position of a light source. They are the same as elements for use in drawing general three-dimensional computer graphics. The shape of the subject is obtained using a method by which the depth of the subject is estimated by stereo matching using a plurality of cameras, and a model is reconstructed from an aggregate of three-dimensional coordinates corresponding to the pixels, for example. To obtain the reflection characteristics of the subject and the position of the light source, a method using the reflection of the light source on a spherical mirror has been proposed, for example.

In addition, to generate a proper relighting image, parameters such as the number of light sources, and the types, placements, and light intensities of the light sources need to be set in a proper manner. For example, Patent Document 1 discloses that only the intensities of the light sources are automatically adjusted. In addition, Patent Document 2 discloses that lights generated at random are listed and used for rendering in a low-frequency area.

CITATION LIST

Patent Documents

Patent Document 1: Japanese Patent Application Laid-Open No. 2009-223906
Patent Document 2: Japanese Patent Application Laid-Open No. 2003-296750

SUMMARY OF THE INVENTION

Problems to be Solved by the Invention

To generate a proper relighting image, parameters such as the number of light sources, and the types, placements, and light intensities of the light sources need to be set in a proper manner. However, the technologies disclosed in Patent Documents 1 and 2 are not applicable to establishment of an arbitrary illumination environment including not only the light intensities of the light sources but also the placements of the light sources.

Accordingly, an object of this technology is to provide an image processing apparatus and an image processing method that facilitate setting of an illumination environment for relighting.

Solutions to Problems

A first aspect of this technology lies in an image processing apparatus including:
 a subject information acquisition unit that acquires imaged subject information indicative of attributes related to illumination for a subject from a taken image;
 an illumination setting information selection unit that selects illumination setting information according to a user operation; and
 an illumination setting information adjustment unit that adjusts the illumination setting information selected by the illumination setting information selection unit to illumination setting information corresponding to the subject on the basis of the imaged subject information acquired by the subject information acquisition unit.

According to this technology, the subject information acquisition unit acquires the attributes related to illumination for the subject, for example, the three-dimensional shape and reflection characteristics of the subject, from the taken images acquired by the image acquisition unit at different viewpoint positions.

The illumination setting information selection unit displays setting selection images associated with the illumination setting information, and sets the illumination setting information corresponding to the setting selection image selected by the user as the selected illumination setting information. For example, the illumination setting information selection unit displays preset information based on the illumination setting information as the setting selection images, and sets the illumination setting information corresponding to the preset information selected by the user as the selected illumination setting information. Alternatively, the illumination setting information selection unit displays preset images as the setting selection images and acquires the illumination setting information from the preset image selected by the user. Still alternatively, the illumination setting information selection unit displays metadata associated with the illumination setting information as the setting selection images, and sets the illumination setting information corresponding to the metadata selected by the user as the selected illumination setting information. In addition, the illumination setting information selection unit selects the illumination setting information that includes imaging mode information matching to imaging mode information on the subject acquired by the subject information acquisition unit.

The illumination setting information adjustment unit adjusts the illumination setting information selected by the illumination setting information selection unit to illumination setting information corresponding to the subject on the basis of the imaged subject information acquired by the subject information acquisition unit. The illumination setting information is generated using a preset coordinate system, for example. The illumination setting information adjustment unit adjusts the illumination setting information to the illumination setting information corresponding to the subject by bringing the coordinate system into correspondence with the subject. The illumination setting information has light source information including information on the placements of the light sources and illumination light and reference subject information including information on the size and placement of a reference subject illuminated by the light sources indicated by the light source information. The illumination setting information adjustment unit brings the coordinate system into correspondence with the subject such that the size and placement of the reference subject match with those of the subject in the taken image. The illumination setting information adjustment unit also adjusts the illumination setting information such that the image of the subject obtained by performing a drawing process using the imaged subject information and the illumination setting information after the adjustment does not become saturated.

The image generation unit performs a drawing process on the basis of the imaged subject information acquired by the subject information acquisition unit and the illumination setting information adjusted by the illumination setting information adjustment unit, thereby to obtain the image of the subject in the illumination environment selected by the user.

A second aspect of this technology lies in an image processing method, including the steps of:

acquiring, by a subject information acquisition unit, imaged subject information indicative of attributes related to illumination for a subject from a taken image;

selecting, by an illumination setting information selection unit, illumination setting information according to a user operation; and adjusting, by an illumination setting information adjustment unit, the illumination setting information selected by the illumination setting information selection unit to illumination setting information corresponding to the subject on the basis of the imaged subject information acquired by the subject information acquisition unit.

Effects of the Invention

According to this technology, the subject information acquisition unit acquires from the taken image the imaged subject information indicating the attributes related to illumination for the subject. In addition, the illumination setting information selection unit selects the illumination setting information according to a user operation. The illumination setting information adjustment unit performs a process for adjusting the selected illumination setting information to the illumination setting information corresponding to the subject on the basis of the imaged subject information. That is, when the user selects the illumination setting information, the selected illumination setting information is adjusted to the illumination setting information corresponding to the subject. Accordingly, by performing a drawing process using the illumination setting information after the adjustment, it is possible to generate the image as if it was acquired in a desired illumination environment. This facilitates setting of the illumination environment for relighting. Note that, the advantageous effect described herein is a mere example and is not limited, and any other additional effect may be provided.

BRIEF DESCRIPTION OF DRAWINGS

FIG. 7 is a list of elements of preset information.

FIG. 9 is a diagram illustrating a specific example of preset information.

FIG. 10 is a diagram illustrating icon images.

MODE FOR CARRYING OUT THE INVENTION

Embodiments for carrying out the present technology will be explained below. Note that, the explanation will be given in the following order:

1. First Embodiment
2. Second Embodiment
3. Third Embodiment
4. Another embodiment An image processing apparatus of this technology includes a subject information acquisition unit, an illumination setting information selection unit, and an illumination setting information adjustment unit. The subject information acquisition unit acquires imaged subject information indicating attributes related to illumination for a subject from taken images. The illumination setting information selection unit selects illumination setting information according to a user operation. For example, the illumination setting information selection unit displays setting selection images associated with the illumination setting information, and sets the illumination setting information corresponding to the setting selection image selected by the user as the selected illumination setting information. The illumination setting information adjustment unit adjusts the illumination setting information selected by the illumination setting information selection unit to illumination setting information corresponding to the subject on the basis of the imaged subject information acquired by the subject information acquisition unit.

1. First Embodiment

In the first embodiment, for selection of the illumination setting information, preset information based on the illumination setting information is displayed as the setting selection images and the illumination setting information corresponding to the preset information selected by the user is set as the selected illumination setting information.

1-1. Configuration of the First Embodiment

Figure 1:
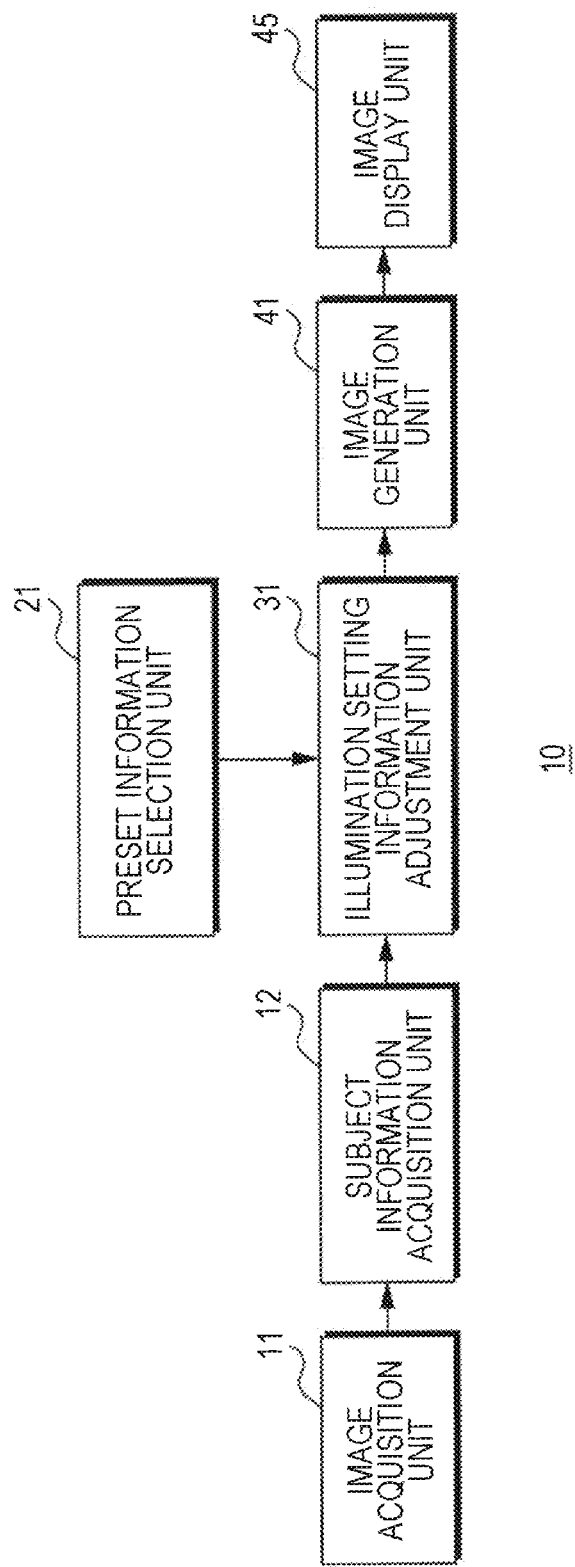
FIG. 1 is a diagram illustrating a configuration of an image processing apparatus of a first embodiment.

FIG. 1 is a diagram illustrating a configuration of an image processing apparatus of a first embodiment. An image processing apparatus 10 includes an image acquisition unit 11, a subject information acquisition unit 12, a preset information selection unit 21, an illumination setting information adjustment unit 31, an image generation unit 41, and an image display unit 45. Note that, the preset information selection unit 21 is equivalent to the illumination setting information selection unit.

The image acquisition unit 11 acquires images from which the three-dimensional shape of a subject, the reflection characteristics of the subject, and the positions of light sources can be estimated. For example, to determine the depths corresponding to the pixel positions on the basis of parallaxes for estimation of the three-dimensional shape of the subject by the subject information acquisition unit 12 described later, the image acquisition unit 11 acquires taken images of the subject by a pair of cameras (so-called stereo cameras) under the same specifications aligned horizontally at a known space therebetween. In addition, to estimate the positions of the light sources by the subject information acquisition unit 12 described later, the image acquisition unit 11 uses bright spots in different positions generated on spherical surfaces in a right-viewpoint image and a left-viewpoint image acquired by the stereo cameras, for example. In this case, the image acquisition unit 11 acquires the taken images of the subject including the spherical mirror within the imaging ranges of the stereo cameras.

Note that, the image acquisition unit 11 may not be necessarily configured to use the stereo cameras but may be configured to read taken images acquired by the stereo cameras from a recording medium, or may be configured to acquire data on the taken images as described above from an external device via a network or the like.

The subject information acquisition unit 12 acquires imaged subject information indicative of attributes related to illumination for the subject from the taken images acquired by the image acquisition unit 11. In the case of imaging the subject using illumination, the taken images vary depending on the three-dimensional shape and reflection characteristics of the subject. Therefore, the subject information acquisition unit 12 acquires information indicative of the three-dimensional shape of the subject (hereinafter, called "subject shape information") and information indicative of the reflection characteristics of the subject (hereinafter, called "reflection characteristic information") as the imaged subject information, for example.

Figure 2:
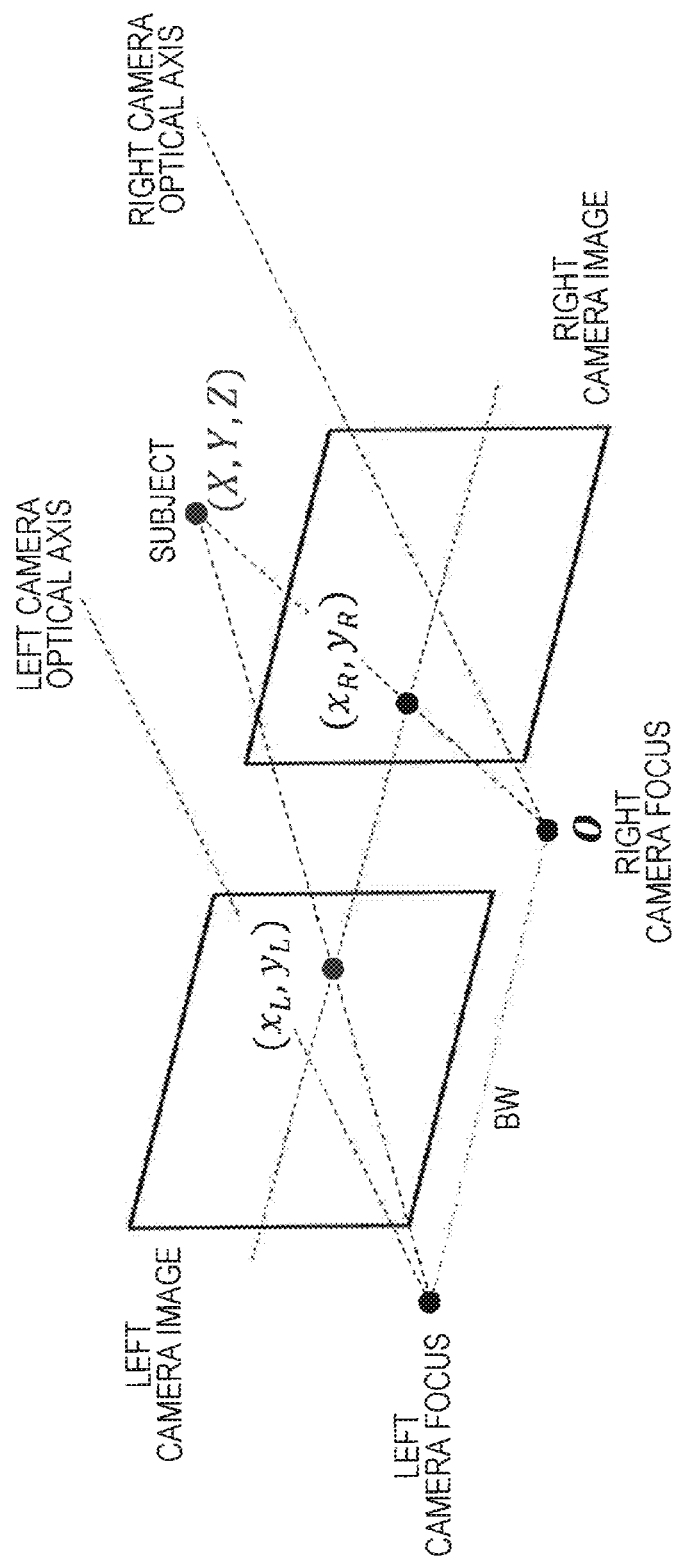
FIG. 2 is a diagram describing a method for acquiring a three-dimensional shape of a subject.

To acquire the subject shape information, the subject information acquisition unit 12 calculates the parallaxes of the pixels of the subject seen in the images acquired by the stereo cameras and determines the depths corresponding to the pixel positions on the basis of the parallaxes. FIG. 2 is a diagram describing a method for acquiring the three-dimensional shape of the subject. The stereo cameras are set such that the optical axes of the right camera and the left camera are parallel to each other. With the focus position of the right camera as the origin, a point on the subject (X, Y, Z) is projected onto a point on the imaging surface of the left camera (xL, yL) and a point on the imaging surface of the right camera (xR, yR). In this case, the point (X, Y, Z) can be expressed by the following formulas (1) to (3) using the point (xL, yL) and the point (xR, yR).

[Mathematical Formula 1]

$$Z = \frac{Bf}{x_L - x_R} \quad (1)$$

$$X = \frac{Z}{f} x_R \quad (2)$$

$$Y = \frac{Z}{f} y_R \quad (3)$$

Note that, in the formulas (1) to (3), "f" represents the focal length of the camera, and "B" represents the inter-base line distance (distance between the optical axes of the right camera and left camera).

When the optical axis of the right camera and the optical axis of the left camera are parallel, the depth of the subject is expressed as a horizontal shift between the imaging surfaces. The amount of the shift in the horizontal coordinate between the imaging surfaces of the left and right cameras (xL-xR) are called parallax.

Figure 3:
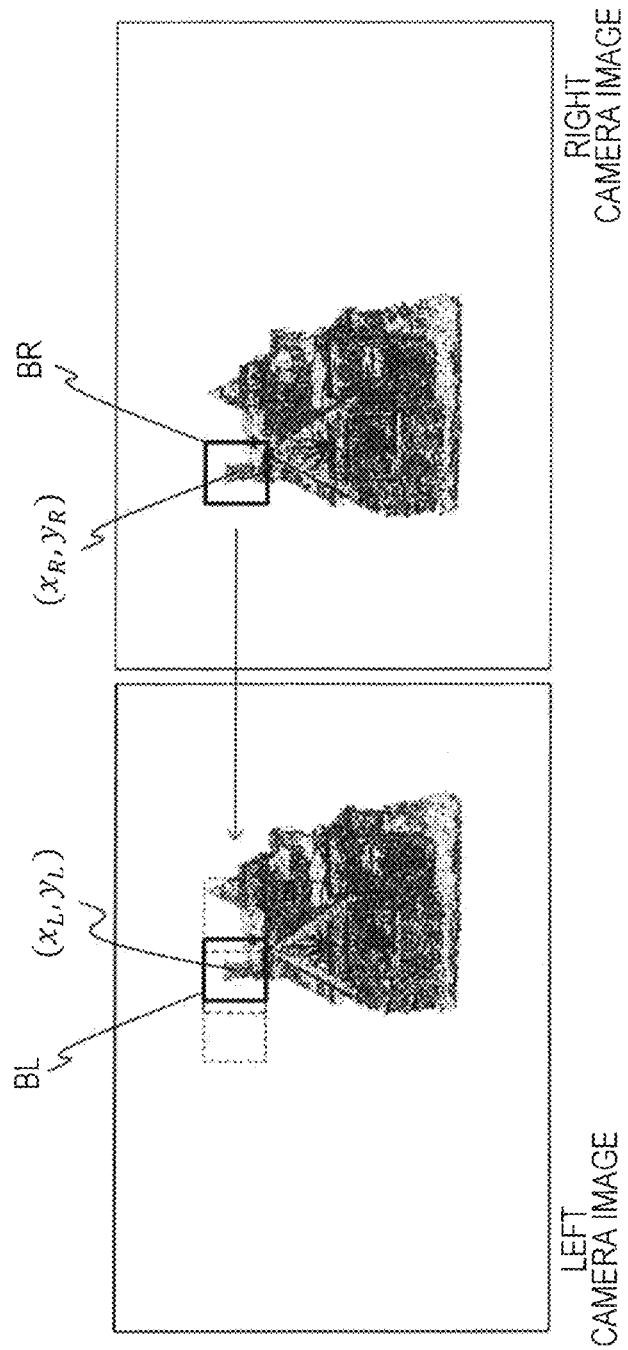
FIG. 3 is a diagram describing a method for determining a parallax.

As described above, the depth can be expressed from the parallax using the formulas (1) to (3). Accordingly, the depth of the subject can be obtained by determining the parallaxes of all the pixels on the imaging surfaces. As a general method for determining the parallaxes, specifically, a block BR is set using peripheral pixels of a reference point of which the parallax is to be determined (in this example, the point (xR, yR) on the right camera image) as illustrated in FIG. 3, for example. In addition, a block BL of the same size as the block BR is set on the left camera image and the position in the block BL with the highest similarity to the block BR is searched to determine the point (xL, yL) corresponding to the point (xR, yR).

The subject information acquisition unit 12 acquires light source information for use in acquisition of the reflection characteristic information. For example, the subject information acquisition unit 12 acquires the position of the light source using bright spots on a spherical mirror seen in the taken image acquired by the stereo cameras, for example. Note that, to acquire the position of the light source, the technology disclosed in a reference literature "Light Source Estimation from Spherical Reflections, Schnieders, 2011," and the like, for example.

Figure 4:
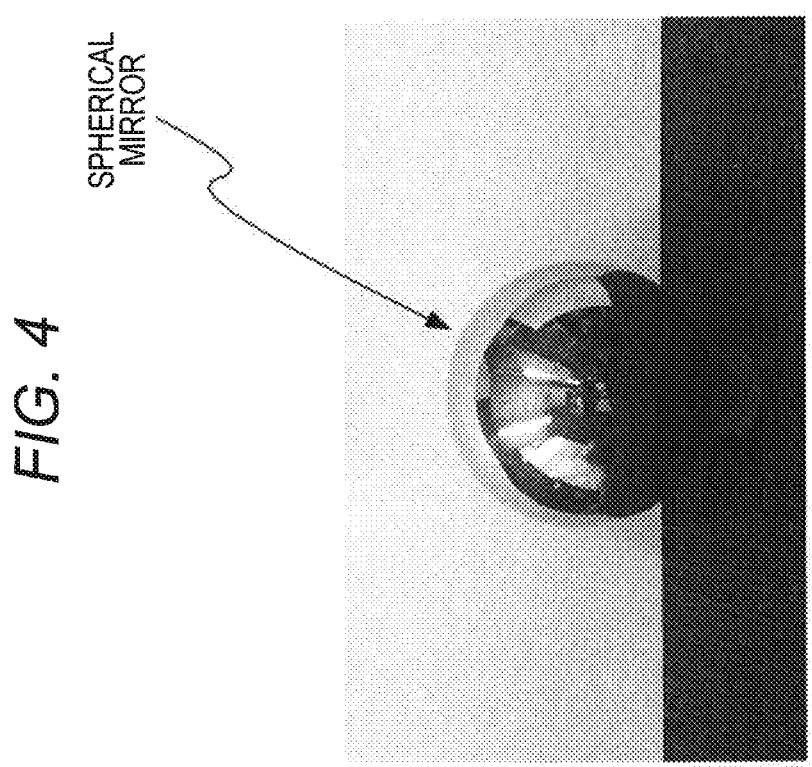
FIG. 4 is a diagram illustrating a spherical mirror.
Figure 5:
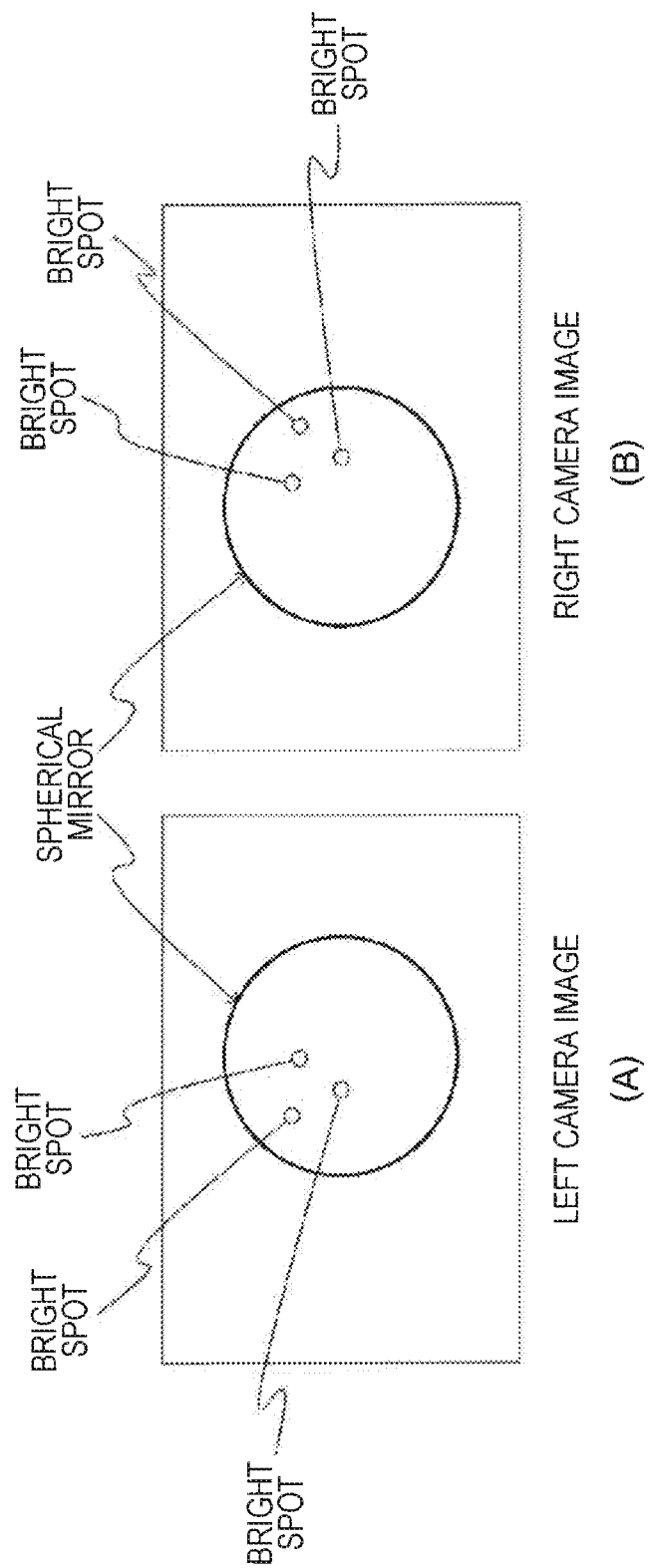
FIG. 5 is a diagram illustrating schematically bright spots when the spherical mirror is shot by stereo cameras.

FIG. 4 illustrates a spherical mirror imaged by cameras. In addition, FIG. 5 illustrates schematically bright spots on the spherical mirror imaged by the stereo cameras, (A) of FIG. 5 showing the bright spots in the left camera image and (B) of FIG. 5 showing the bright spots in the right camera. As seen in the drawings, when the positions of the cameras are different, the bright spots appear at different positions on the spherical surface in the taken images. When the size of the spherical mirror is known, the depth of the spherical mirror, that is, the three-dimensional position of the spherical mirror can be determined using the size of a circle extracted by performing circle detection on the taken image.

Figure 6:
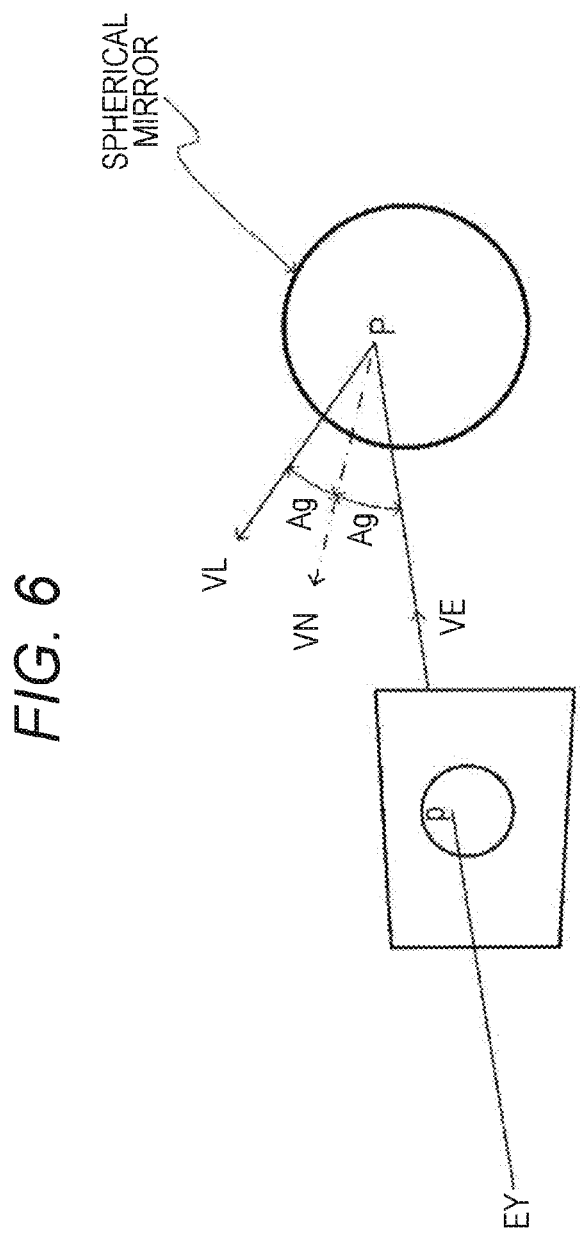
FIG. 6 is a diagram describing the relationship between a bright spot on the spherical mirror and the direction of a light source.

FIG. 6 is a diagram describing the relationship between a bright spot on the spherical mirror and the direction of a light source. With respect to a bright spot P on the spherical mirror corresponding to a bright spot p on the image of the camera, a vector VE is set as a ray vector from a viewpoint EY to the bright spot, and a vector VN is set as a normal vector of the sphere at the bright spot P. By setting the ray vector and the normal vector in this manner, an incident light vector VL indicating the direction of incident light from the light source can be calculated by formula (4). Note that, the ray vector VE can be calculated from formula (5) when the three-dimensional position of the bright spot P is set as $PM=(X, Y, Z)^T$. FIG. 6 also indicates that the angle formed by the ray vector VE and the normal vector VN and the angle formed by the normal vector VN and the incident light vector VL are both equal to an angle Ag.

[Mathematical Formula 2]

$$VL = VE - (2VN \cdot VE)VN \quad (4)$$

$$VE = \frac{PM}{\|PM\|} \quad (5)$$

As for a light source Lm, the three-dimensional position of a bright spot seen from the right camera is set as $PMR=(XR, YR, ZR)^T$, and the three-dimensional position of the bright spot seen from the left camera is set as $PML=(XL, YL, ZL)^T$. In this case, the three-dimensional positions PMR and PML can be determined as points of intersection between the ray vector from the camera to the bright spot and the mirror. Specifically, the position of the light source Lm can be expressed by simultaneous formulas (6) and (7) using the three-dimensional positions PMR and PML:

[Mathematical Formula 3]

$$Lm = PM_R + k_R\left\{\frac{PM_R}{\|PM_R\|} - \left(2VN_R \cdot \frac{PM_R}{\|PM_R\|}\right)VN_R\right\} \quad (6)$$

$$Lm = (PM_L - VB) + k_L\left\{\frac{PM_L - VB}{\|PM_L - VB\|} - \left(2VN_L \cdot \frac{PM_L - VB}{\|PM_L - VB\|}\right)VN_L\right\} \quad (7)$$

Note that, the position vector VB is equal to $(-B, 0, 0)^T$, that is, the position vector of the left camera. In addition, the normal vector VNR is a normal vector of the sphere at the bright spot PR, and a normal vector VNL is a normal vector of the sphere at the bright spot PL. Coefficients kR and kL are determined in the formulas (6) and (7) by the principles of triangulation, whereby the position of the light source LS can be calculated. In addition, the intensity and color of the light source can be determined from the colors of the bright spots on the mirror.

Next, the subject information acquisition unit 12 acquires the reflection characteristic information on the subject using the subject shape information and the light source information. Note that, to acquire the reflection characteristics, the technology disclosed in a reference literature "Principles of Appearance Acquisition and Representation, Weyrich et al., 2008" and the like can be used.

The reflection characteristics are generally estimated by assuming in advance a reflection model of an object and determining parameters in the model. In the present technology, it is assumed that one subject can be expressed by a uniform bidirectional reflectance distribution function (BRDF). In addition, the estimation is performed on the assumption that the subject can be expressed by a Phong model. The Phong model is a model expressed such that the reflection characteristics of the object constitute the superimposition of an environmental light component, a diffuse reflection component, and a mirror reflection component, and a brightness Iu taking into account a point u on the surface of the subject is expressed by formula (8):

[Mathematical Formula 4]

$$I_u = k_a i_a + \Sigma_{m \in lights}\{k_d(VL_m \cdot VN_u)i_{m,d} + k_s(Vr_m \cdot VF_u)^q i_{m,s}\} \quad (8)$$

In the formula (8), the intensity ia represents the intensity of environmental light, the intensity im,d represents the intensity of diffuse reflection light of a light source m, the intensity im,s represents the intensity of mirror reflection light of the light source m. In addition, the incident light vector VLm is a vector representing the entry of light from the light source m into the subject. The normal vector $VN_u$ is a normal vector of the subject on the point u. The vector Vrm is a reflection light vector on the surface of the subject. A vector $VF_u$ is a vector from the point u to an observation point. Coefficient q is a parameter for adjusting the intensity distribution of mirror reflection. Further, coefficients ka, kd, and ks are intensity coefficients of the components according to the material of the object. The reflection characteristics can be determined by estimating the intensity coefficients.

Since the three-dimensional shape of the subject is known, the vector $VF_u$ and the normal vector $VN_u$ can be calculated at the points u of the subject. In addition, the position of the light source and the color and intensity of the light source can also be made clear by using the information indicative of the light source, and therefore the incident light vector VLm and the vector Vrm can be calculated. Further, the intensity im,d and the intensity im,s can be regarded as known. The intensity ia is generally expressed as the sum of intensities of the light sources, and therefore it can also be calculated. That is, all the parameters except for the intensity coefficients ka, kd, and ks and the coefficient q indicative of the mirror reflection parameter can be regarded as known. Accordingly, it is possible to calculate the foregoing formulas for the points u on the subject and solve the coefficients ka, kd, ks, and q by means of simultaneous formulas from the assumption that the BRDF of the subject is uniform. That is, by solving the coefficients ka, kd, ks, and q by means of simultaneous formulas, it is possible to acquire the information indicative of reflection characteristics of the subject. In addition, at the time of estimation of the reflection characteristics, the information indicative of the reflection characteristics according to the material of the subject may be acquired by prescribing the material of the subject and adjusting the values of the intensities of the diffuse reflection light and the mirror reflection light according to the material. For example, when the material is a metal, the reflection characteristic information is acquired with increase in the value of the intensity of the mirror reflection light.

The preset information selection unit 21 illustrated in FIG. 1 selects preset information according to a user operation. The preset information selection unit 21 stores in advance one or more units of preset information indicative of light source information. The preset information selection unit 21 outputs to the illumination setting information adjustment unit 31 the preset information selected according to the user operation.

FIG. 7 represents a list of elements of preset information. The preset information has light source information and reference subject information, for example. The light source information is composed of number-of-light source information and light source attribute information. The number-of-light source information indicates the number of light sources for use in illumination. The light source attribute information is provided for each of a number of light sources indicated by the number-of-light source information. The light source attribute information is composed of position information, direction information, intensity information, color information, type information, color temperature information, and the like, for example. The position information indicates the distance of the light source from a reference center Op for each of reference coordinate axes xr, yr, and zr in the preset coordinate system. The direction information indicates the direction of emission of irradiation light from the light source by a normalized vector, for example. The intensity information indicates brightness of the irradiation light from the light source in the unit of lumen, for example. The color information indicates the color of the irradiation light from the light source by the values of the three primary color components, for example. The type information indicates the type of the light source, for example, point light source, surface light source, spot light source, parallel light source, hemispherical environmental light source, or the like. The color temperature information indicates the color temperature of the illumination light from the light source, for example, with white color 6500K (Kelvin temperature) as a reference color temperature. Note that, when no color temperature is set, the reference color temperature is used.

The reference subject information is composed of size information, barycenter information, coordinate axis information, material information, imaging mode information, and the like, for example. The size information indicates the radius of a sphere circumscribing the subject assumed in the preset information. Note that, the subject assumed in the preset information is set as a reference subject to differentiate the subject assumed in the preset information from the imaged subject. The barycenter information indicates at which position in the preset coordinate system the barycenter of the reference subject is placed. The coordinate axis information indicates with which direction in the preset coordinate system the major three axes of the reference subject are associated. For example, the major three axes of the reference subject are indicated as vector quantities in the preset coordinate system. The material information is information for setting as what material the imaged subject is to be subjected to relighting. When no material is prescribed, the material of the subject, that is, the material prescribed at the time of estimation of the reflection characteristics is used. The imaging mode information is used to determine whether the imaging mode corresponds to the imaged subject or the like.

Figure 8:
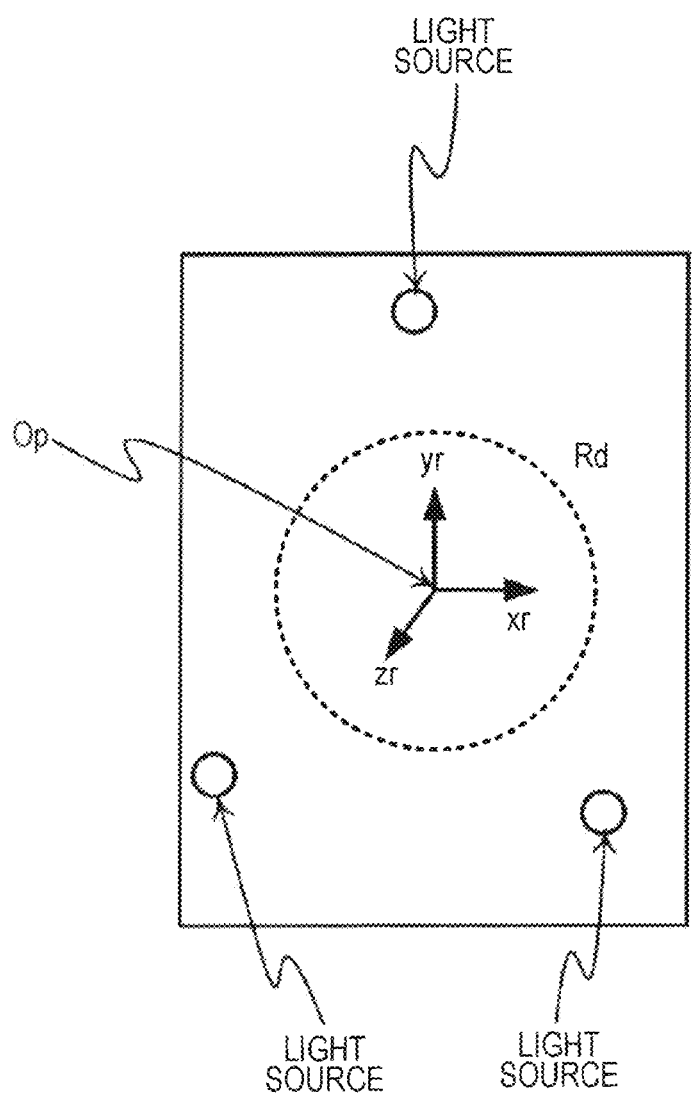
FIG. 8 is a diagram illustrating light source information.

FIG. 8 illustrates light source information, for example, the reference center Op, the reference coordinate axes xr, yr, and zr, and the positions, types, and intensities of the light sources. In addition, a reference radius Rd is the radius of a sphere circumscribing the reference subject in the case where the barycenter of the reference subject is set at the reference center Op of the preset coordinate system.

FIG. 9 is a diagram illustrating a specific example of preset information in which relighting of a person is performed using two light sources. A light source 1 is provided at a position of (1, 0, 1) [unit:m] and the direction of illumination is set at (−0.707, 0, −0.707). The brightness of the light source 1 is 3000 lumens, and the color of illumination is white. In addition, the light source 1 is a surface light source with a size of (0.3×0.3) [unit:m], and the color temperature is set to 6500K for each color. A light source 2 is similar to the light source 1 and is provided at a position of (−0.8, 0, 1) [unit:m], and the direction of illumination is set to (0.625, 0, −0.781). The barycenter of the reference subject is at the reference center of the preset coordinate system, and the coordinate system of the reference subject is matched to the preset coordinate system.

In the reference subject information, the size of the reference subject is set to 0.5 m. The barycenter of the reference subject is set as center of the preset coordinate system, and the coordinate axis information has the major three axes of the reference subject matched to the preset coordinate system. In addition, to perform relighting of a person, the material of the subject for which the illumination environment is to be changed is set as skin and the imaging mode is set as portrait.

The preset information selection unit 21 stores in advance a plurality of units of preset information, and selects the preset information according to a user operation.

FIG. 10 illustrates icon images displayed on an image display unit 45 of the image processing apparatus 10 according to the preset information. The icon image is an image indicating schematically the reference subject, for example. In addition, the icon image may include images related to light sources. For example, when the reference subject is a person's face, an image of a modeled person's face and images indicative of information on the light sources, for example, the number and positions of the light sources, are provided as illustrated in (A) of FIG. 10. Alternatively, the icon image may be an image not including the information on the light sources as illustrated in (B) of FIG. 10. Note that, (C) of FIG. 10 illustrates an icon image of a person's upper body part.

Figure 11:
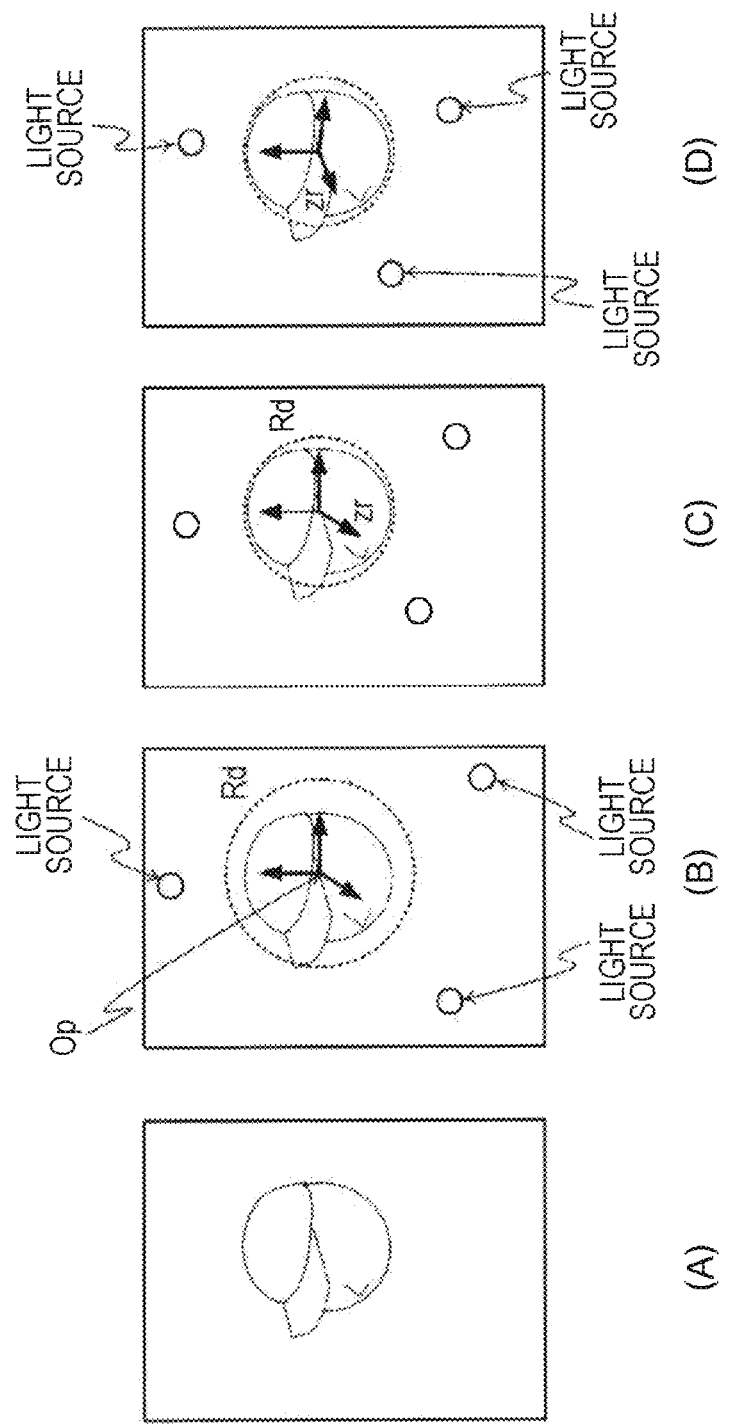
FIG. 11 is a diagram describing a process for adjusting illumination setting information.

The illumination setting information adjustment unit 31 illustrated in FIG. 1 adjusts the preset information selected by the preset information selection unit 21 according to the imaged subject. FIG. 11 is a diagram describing a process for adjusting the illumination setting information by the illumination setting information adjustment unit 31. The illumination setting information adjustment unit 31 adjusts the preset coordinate system such that the size and placement of the reference subject indicated by the preset information match with those of the imaged subject, and adjusts the information on the light sources according to the adjustment of the coordinate system. Note that, for the sake of simplicity of explanation, the barycenter of the reference subject is at the reference center of the preset coordinate system, and the coordinate system of the reference subject matches with the preset coordinate system.

The illumination setting information adjustment unit 31 places the light sources relative to the subject illustrated in (A) of FIG. 11 such that the reference center Op of the preset coordinate system (the barycenter of the reference subject) matches with the barycenter of the imaged subject as illustrated in (B) of FIG. 11. Next, the illumination setting information adjustment unit 31 performs scaling of the reference radius Rd indicated by the preset information (the radius of the sphere circumscribing the reference subject) such that the reference radius Rd matches with the radius of the sphere circumscribing the imaged subject as illustrated in (C) of FIG. 11. That is, the illumination setting information adjustment unit 31 changes the scale of the preset light source coordinate system to change the distance from the barycenter of the imaged subject to the light source.

After that, the illumination setting information adjustment unit 31 sets coordinate axes to the imaged subject on the basis of the three-dimensional shape of the imaged subject, the imaging mode of the taken image, and the like, and brings the coordinate axes in the preset coordinate system into correspondence with these coordinate axes. When the target subject is a person, for example, the illumination setting information adjustment unit 31 extracts the person's face from the taken image and sets the front side of the face as a reference coordinate axis zr in the preset coordinate system as illustrated in (D) of FIG. 11. The illumination setting information adjustment unit 31 also defines the vertically upward direction as a reference coordinate axis yr, and defines the vector orthogonal to the two foregoing axis vectors, that is, the direction of the cross product vector of the two foregoing axes as a reference coordinate axis xr. In addition, in the case where the taken image is a scenic image, the illumination setting information adjustment unit 31 defines the front side of the camera as a major coordinate axis direction, and defines the vertically upper direction as a reference coordinate axis yr with respect to the direction of the front side of the camera as a reference coordinate axis zr, and the direction of the vector orthogonal to the two foregoing axis vectors as a reference coordinate axis xr.

The illumination setting information adjustment unit 31 performs the foregoing process to adjust the placements of the light sources in correspondence with the imaged subject. Further, the illumination setting information adjustment unit 31 or the image generation unit 41 performs a drawing process on the basis of the placements of the light sources after the adjustment. In this example, the subject information acquisition unit 12 acquires the subject shape information and the reflection characteristic information. In addition, the illumination setting information adjustment unit 31 places the light sources included in the preset information selected by the user in correspondence with the imaged subject. Therefore, the drawing process is carried out by a method similar to conventional computer graphics on the basis of the acquired subject shape information and the reflection characteristic information, the placements of the light sources after the adjustment, the colors and intensities of the light sources included in the selected preset information. Note that, as a reflection model of the subject, a Phong model is used as in the estimation of the reflection characteristics.

In addition, the illumination setting information adjustment unit 31 uses the image generated by the drawing process to calculate the color and brightness of the entire image. When determining that the brightness and color are saturated from the calculated results of the color and brightness of the entire image, the illumination setting information adjustment unit 31 adjusts the intensities of the light sources so as not to saturate the brightness and the color. For example, when the brightness value of the image generated by the drawing process is likely to be saturated, the illumination setting information adjustment unit 31 performs scaling of intensity im of each light source m such that maximum brightness value IMAX of all the pixels matches with a maximum value IRANGE of an image dynamic range. Specifically, the illumination setting information adjustment unit 31 calculates a corrected intensity imc as an intensity after scaling by formula (9).

[Mathematical Formula 5]

$$i_{mc} = i_m \cdot \frac{I_{RANGE}}{I_{MAX}} \quad (9)$$

Note that, the scaling of the intensities im of the light sources m may be repeatedly performed until the brightness and color are no longer saturated.

By performing such a process, the light source information can be automatically optimized on the basis of the preset information selected by the preset information selection unit 21 and the taken image. The illumination setting information adjustment unit 31 outputs to the image generation unit 41 the preset information after the adjustment optimized according to the imaged subject.

The image generation unit 41 performs a drawing process. The image generation unit 41 performs the drawing process on the basis of the taken images acquired by the image acquisition unit 11, the imaged subject information acquired by the subject information acquisition unit 12, and the preset information after the adjustment supplied from the illumination setting information adjustment unit 31. By performing the drawing process, the image generation unit 41 generates the taken image in the illumination environment based on the selected preset information and the imaged subject, and outputs the same to the image display unit 45.

The image display unit 45 displays the image generated by the image generation unit 41 on the screen. In addition, the image display unit 45 is associated with the preset information selection unit 21 and may display icon images indicative of the preset information selectable by the preset information selection unit 21 and the like. For example, a user operation input means such as a touch panel is provided on the screen of the image display unit 45 to allow the user to select any of the icon images displayed on the screen of the image display unit 45. The preset information selection unit 21 selects the preset information corresponding to the icon image selected by the user. In addition, the preset information selection unit 21 may be provided with an image display function to display icon images indicative of the preset information selectable by the preset information selection unit 21 and the like.

Figure 12:
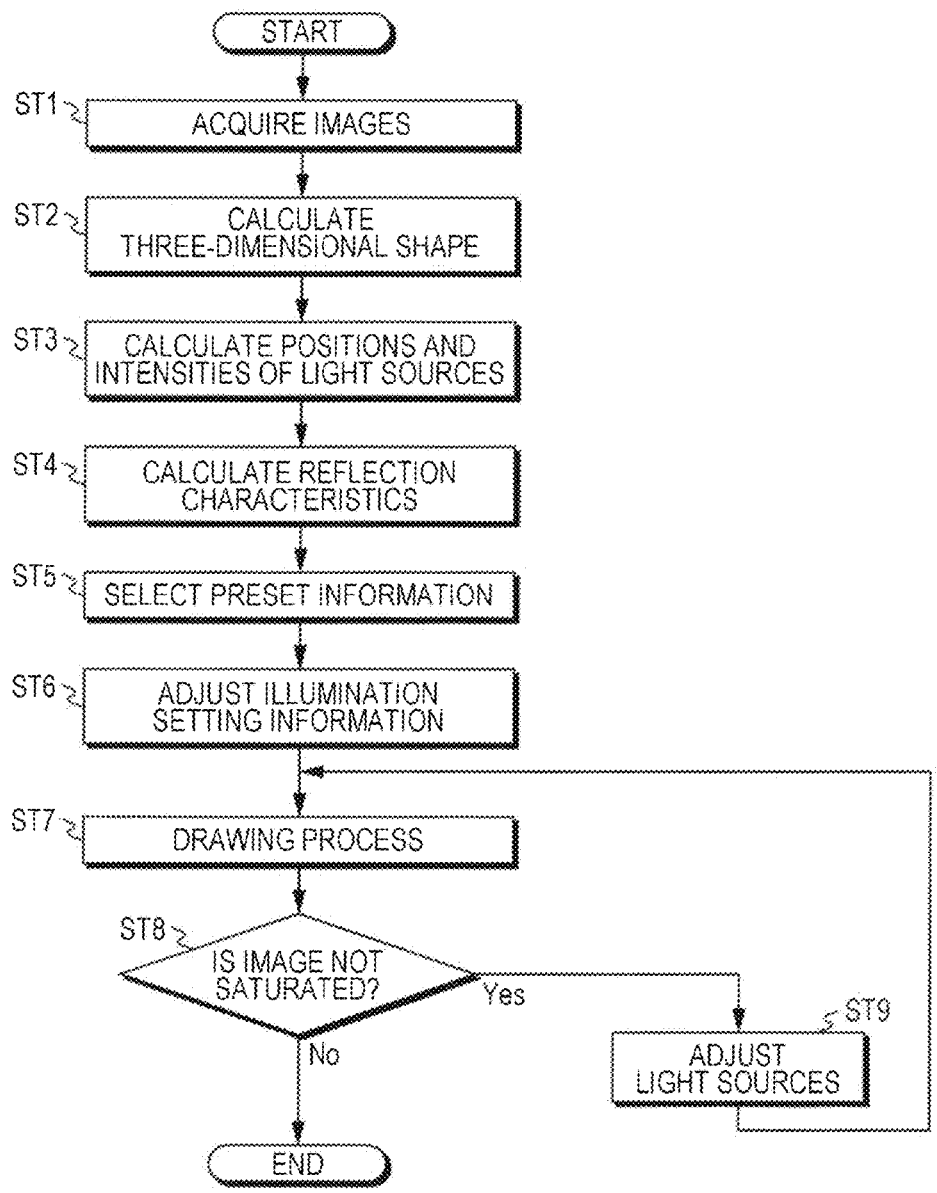
FIG. 12 is a flowchart of an operation in the first embodiment.

Next, an operation in the first embodiment will be explained. FIG. 12 is a flowchart of the operation in the first embodiment.

At step ST1, the image processing apparatus 10 acquires images. Specifically, the image acquisition unit 11 of the image processing apparatus 10 acquires the taken images from which the three-dimensional shape of the subject, the reflection characteristics of the subject, and the positions of the light sources can be estimated. The image acquisition unit 11 acquires the taken images acquired by the stereo cameras or the taken images acquired by the stereo cameras and recorded in a recording medium, and the like, for example. In addition, the image acquisition unit 11 may acquire these images via a network or the like. The image processing apparatus 10 acquires the images and then moves to step ST2.

At step ST2, the image processing apparatus 10 calculates the three-dimensional shape of the subject. Specifically, the subject information acquisition unit 12 of the image processing apparatus 10 uses the images acquired by the image acquisition unit 11 to calculate the parallaxes of the pixels of the subject, for example, and determine the depths corresponding to the pixel positions on the basis of the parallaxes, thereby calculating the three-dimensional shape of the imaged subject. The image processing apparatus 10 calculates the three-dimensional shape of the subject and then moves to step ST3.

At step ST3, the image processing apparatus 10 calculates the positions and intensities of the light sources relative to the subject. Specifically, the subject information acquisition unit 12 of the image processing apparatus 10 estimates the positions of the light sources on the basis of bright spots on a spherical mirror seen in the taken images and calculates the colors and intensities of the light sources from the colors of the bright spots on the spherical mirror, for example. The image processing apparatus 10 calculates the positions and intensities of the light sources relative to the subject and then moves to step ST4.

At step ST4, the image processing apparatus 10 calculates the reflection characteristics of the subject. Specifically, the subject information acquisition unit 12 of the image processing apparatus 10 assumes a reflection model of an object in advance and calculates the reflection characteristics on the basis of the three-dimensional shape of the subject calculated at step ST2 and the positions and intensities of the light sources calculated at step ST3, for example. For example, since the three-dimensional shape of the imaged subject is known, the subject information acquisition unit 12 calculates the vector $VF_u$ toward the observation point and the normal vector $VN_u$ of the subject at each point u in the subject. In addition, the positions of the light sources and the colors and intensities of the light sources are known, the subject information acquisition unit 12 can calculate the incident light vector VLm and the reflection light vector Vrm. Further, since the intensities im,d and the intensities im,s are regarded as known, the subject information acquisition unit 12 calculates the intensity coefficients ka, kd, and ks and the coefficient q indicative of the mirror reflection parameter using the formula (8) on the basis of the assumption that the BRDF of the subject is uniform. The image processing apparatus 10 calculates the reflection characteristics of the subject in this manner and then moves to step ST5.

Figure 13:
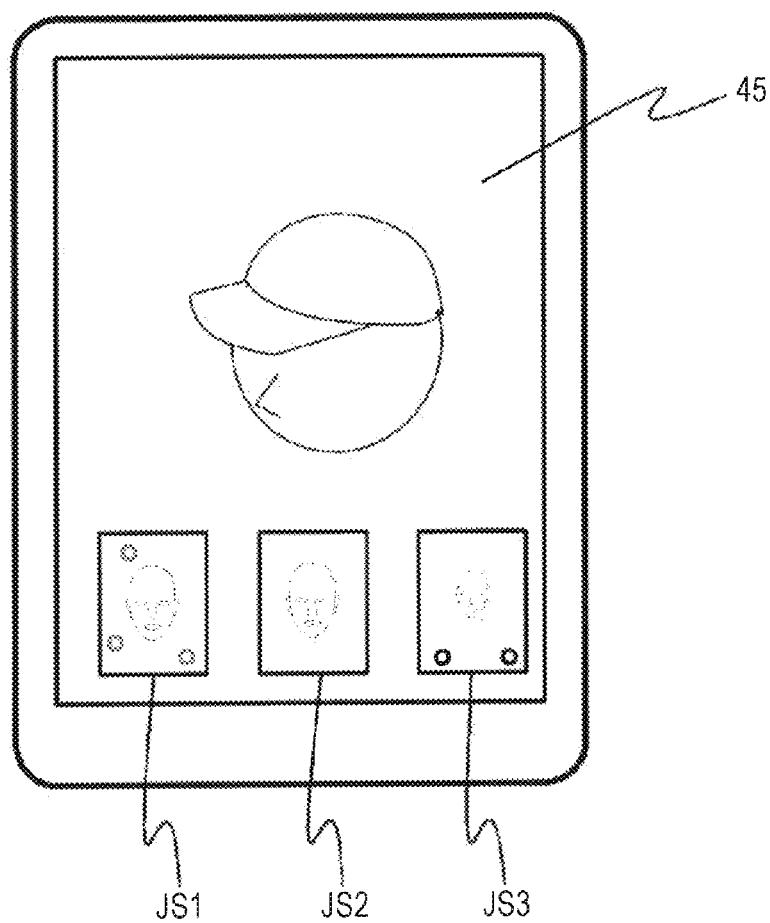
FIG. 13 is a diagram describing an action of selecting the preset information.

At step ST5, the image processing apparatus 10 selects the preset information. Specifically, the preset information selection unit 21 of the image processing apparatus 10 selects the preset information from among the pre-stored preset information according to a user operation. The preset information selection unit 21 selects the preset information from among the pre-stored preset information according to a user operation. For example, as illustrated in FIG. 13, preset information JS1 to JS3 are displayed on the screen of the image display unit 45 to allow the user to select any of the preset information. The image processing apparatus 10 selects the preset information according to a user operation and then moves to step ST6.

At step ST6, the image processing apparatus 10 adjusts the illumination setting information. Specifically, the illumination setting information adjustment unit 31 of the image processing apparatus 10 adjusts the illumination setting information, that is, the preset information selected at step ST5 according to the three-dimensional shape of the imaged subject and the like. For example, the illumination setting information adjustment unit 31 matches the central position of the preset coordinate system to the barycenter of the imaged subject, and performs scaling such that the reference radius Rd defined in the preset information corresponds to the size of the imaged subject. Further, the illumination setting information adjustment unit 31 brings the coordinate axes of the coordinate system the preset information into correspondence with the coordinate axes according to the imaged subject, and adjusts the placements of the light sources indicated by the preset information according to the image subject. The image processing apparatus 10 adjusts the illumination setting information in this manner and then moves to step ST7.

At step ST7, the image processing apparatus 10 performs a drawing process. Specifically, the image generation unit 41 of the image processing apparatus 10 performs a drawing process on the basis of the taken images acquired at step ST1, the three-dimensional shape of the subject calculated at step ST2, the reflection characteristics calculated at step ST4, and the preset information adjusted at step ST6. The drawing process is performed by a manner similar to conventional computer graphics. The image processing apparatus 10 performs the drawing process to generate the image with a change in the illumination environment, and then moves to step ST8.

At step ST8, the image processing apparatus 10 determines whether there is no saturation in the image. Specifically, the illumination setting information adjustment unit 31 of the image processing apparatus 10 uses the image generated by the drawing process to calculate the color and brightness of the entire image. When determining that there is saturation in the brightness and color on the basis of the calculated results of the color and brightness of the entire image, the image processing apparatus 10 moves to step ST9. When there is no saturation in the brightness or color, the image processing apparatus 10 terminates the process.

At step ST9, the image processing apparatus 10 adjusts the light sources. Specifically, the illumination setting information adjustment unit 31 of the image processing apparatus 10 adjusts the light sources so as not to saturate the brightness and color of the image generated by the drawing process. For example, when the brightness is likely to be saturated, the illumination setting information adjustment unit 31 performs scaling of the intensities of the light sources such that the maximum brightness value of all the pixels matches with the maximum value of the image dynamic range. In addition, as for the color, the illumination setting information adjustment unit 31 also performs scaling of the intensities of the light sources. The image processing apparatus 10 adjusts the light sources in this manner and then returns to step ST7.

According to the first embodiment, the illumination environment is automatically set according to the preset information selected by the user and the imaged subject. Therefore, the image processing apparatus facilitates setting of the illumination environment for relighting. Accordingly, by simply selecting desired preset information, the user can obtain an image as if it was acquired in the desired illumination environment.

2. Second Embodiment

Next, a second embodiment will be explained. In the second embodiment, for selection of the illumination setting information, preset images are displayed as setting selection images, and the illumination setting information is acquired from the preset image selected by the user.

Figure 14:
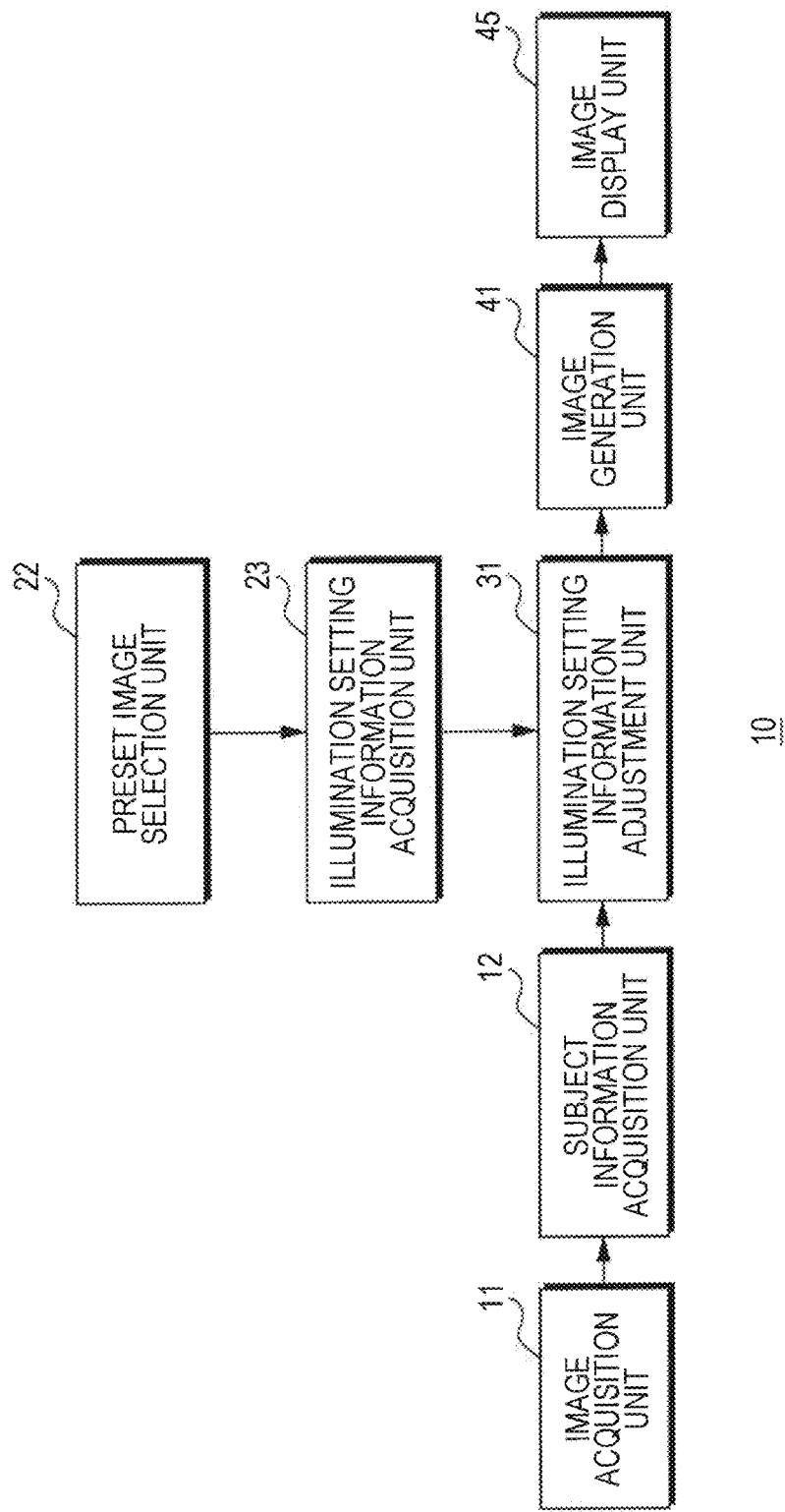
FIG. 14 is a diagram illustrating a configuration of an image processing apparatus of a second embodiment.

FIG. 14 illustrates a configuration of an image processing apparatus of a second embodiment. An image processing apparatus 10 includes an image acquisition unit 11, a subject information acquisition unit 12, a preset image selection unit 22, an illumination setting information acquisition unit 23, an illumination setting information adjustment unit 31, an image generation unit 41, and an image display unit 45. Note that, the preset image selection unit 22 and the illumination setting information acquisition unit 23 are equivalent to the illumination setting information selection unit.

The image acquisition unit 11 acquires images from which the three-dimensional shape of a subject, the reflection characteristics of the subject, and the positions of light sources can be estimated. For example, to determine the depths corresponding to the pixel positions on the basis of parallaxes for estimation of the three-dimensional shape of the subject by the subject information acquisition unit 12, the image acquisition unit 11 acquires taken images of the subject by a pair of cameras (stereo cameras) under the same specifications aligned horizontally at a known space therebetween. In addition, to estimate the positions of the light sources by the subject information acquisition unit 12, the image acquisition unit 11 uses bright spots in different positions on spherical surfaces in a right-viewpoint image and a left-viewpoint image acquired by the stereo cameras. In this case, the image acquisition unit 11 acquires the taken images of the subject including the spherical mirror within the imaging ranges of the stereo cameras. Note that, the image acquisition unit 11 may be configured to read the taken images acquired by the stereo cameras from a recording medium, or may be configured to acquire data on the taken images as described above from an external device via a network or the like.

The subject information acquisition unit 12 acquires the imaged subject information from the taken images acquired by the image acquisition unit 11, for example, the subject shape information and the reflection characteristic information. The subject information acquisition unit 12 calculates the parallaxes of the pixels of the subject seen in the stereo cameras, for example, and determines the depths corresponding to the pixel positions on the basis of the parallaxes, thereby acquiring the subject shape information. The subject information acquisition unit 12 also determines the light source information, for example, the positions, intensities, colors, and the like of the light sources, using the bright spots on the spherical mirror included in the taken images obtained by the stereo cameras, for example. The subject information acquisition unit 12 further acquires the reflection characteristic information indicative of the reflection characteristics of the imaged subject on the basis of the subject shape information and the light source information.

The preset image selection unit 22 selects a preset image according to a user operation. The preset image selection unit 22 stores in advance one or more images acquired in different illumination environments as preset images. The preset image selection unit 22 outputs the preset image selected according to a user operation to the illumination setting information acquisition unit 23. When the user performs an operation for selecting a preset image displayed on the image display unit 45, for example, the preset image selection unit 22 outputs the preset image selected by the user to the illumination setting information acquisition unit 23.

The illumination setting information acquisition unit 23 extracts the positions and intensities of the light sources from the preset image selected by the preset image selection unit 22. Note that, to extract the positions and intensities of the light sources from the preset image, the technology disclosed in a reference literature "Single image based illumination estimation for lighting virtual, object in real scene, Chen et al., 2011" and the like can be used, for example.

The illumination setting information acquisition unit 23 extracts three feature amounts from the preset image, that is, a three-dimensional structure of a rough scene, shadows in the subject, and reflection characteristics of the subject, for example. The three-dimensional structure of the scene is determined in a rough level by comparing the color distribution, edge, and texture information of the entire image as feature amounts to a machine learning database for scene structures prepared in advance. The shadows and reflection characteristics of the subject may be obtained by dividing the color information in the image into shadow components and reflection components, or may be obtained by comparing the color information to a machine learning database for color component divisions prepared in advance as in the case with the three-dimensional structure. The illumination setting information acquisition unit 23 further determines the positions and intensities of the light sources using the rough three-dimensional structure and the shadows and reflection characteristics of the subject. When the number of the light sources is limited to one or a small number, the determination of the positions and intensities of the light sources can be regarded as the determination of the incident light vectors VLm of the light sources m, the intensities $im,d$ of the diffuse reflection light from the light sources m, and the intensities $im,s$ of the mirror reflection light from the light sources m by the formula (8) as in the first embodiment. Therefore, the directions and intensities of the light sources can be calculated as in the first embodiment. In addition to the determined directions and intensities of the light sources, the illumination setting information acquisition unit 23 sets the longest one of the distances from the reference center Op as the barycenter of the three-dimensional structure to the apexes of the three-dimensional structure, as reference radius Rd. The illumination setting information acquisition unit 23 also assumes that the light sources are uniformly positioned at the reference radius Rd from the reference center Op, and acquires from the preset image information similar to the preset information in the first embodiment as illumination setting information.

The illumination setting information adjustment unit 31 adjusts the illumination setting information acquired by the illumination setting information acquisition unit 23 according to the imaged subject. In addition, the illumination setting information adjustment unit 31 or the image generation unit 41 performs a drawing process on the basis of the illumination setting information after the adjustment. As described above, the subject information acquisition unit 12 acquires the subject shape information and the reflection characteristic information. The illumination setting information adjustment unit 31 also adjusts the illumination setting information acquired from the preset image selected by the user according to the imaged subject. Therefore, the drawing is performed in a manner similar to the conventional computer graphics using the subject shape information and the reflection characteristics acquired by the subject information acquisition unit 12, the illumination setting information adjusted by the illumination setting information adjustment unit 31, and the like.

The illumination setting information adjustment unit 31 further uses the image generated by the drawing process to calculate the color and brightness of the entire image. When determining that the brightness and color of the entire image are saturated, the illumination setting information adjustment unit 31 adjusts the intensities of the light sources so as not to saturate the brightness and the color.

The image generation unit 41 performs a drawing process. The image generation unit 41 performs the drawing process on the basis of the taken images acquired by the image acquisition unit 11, the imaged subject information acquired by the subject information acquisition unit 12, and the illumination setting information after the adjustment supplied from the illumination setting information adjustment unit 31. By performing the drawing process, the image generation unit 41 generates the taken image in the illumination environment obtained by adjusting the illumination environment at the time of generation of the selected preset image on the basis of the imaged subject, and outputs the same to the image display unit 45.

The image display unit 45 displays the image generated by the image generation unit on the screen. In addition, the image display unit 45 is associated with the preset image selection unit 22 and may display preset images selectable by the preset image selection unit 22. For example, a user operation input means such as a touch panel is provided on the screen of the image display unit 45 to allow the user to select any of the preset images displayed on the screen of the image display unit 45. The preset image selection unit 22 selects the preset image selected by the user. In addition, the preset image selection unit 22 may be provided with an image display function to display preset images selectable by the preset image selection unit 22.

Figure 15:
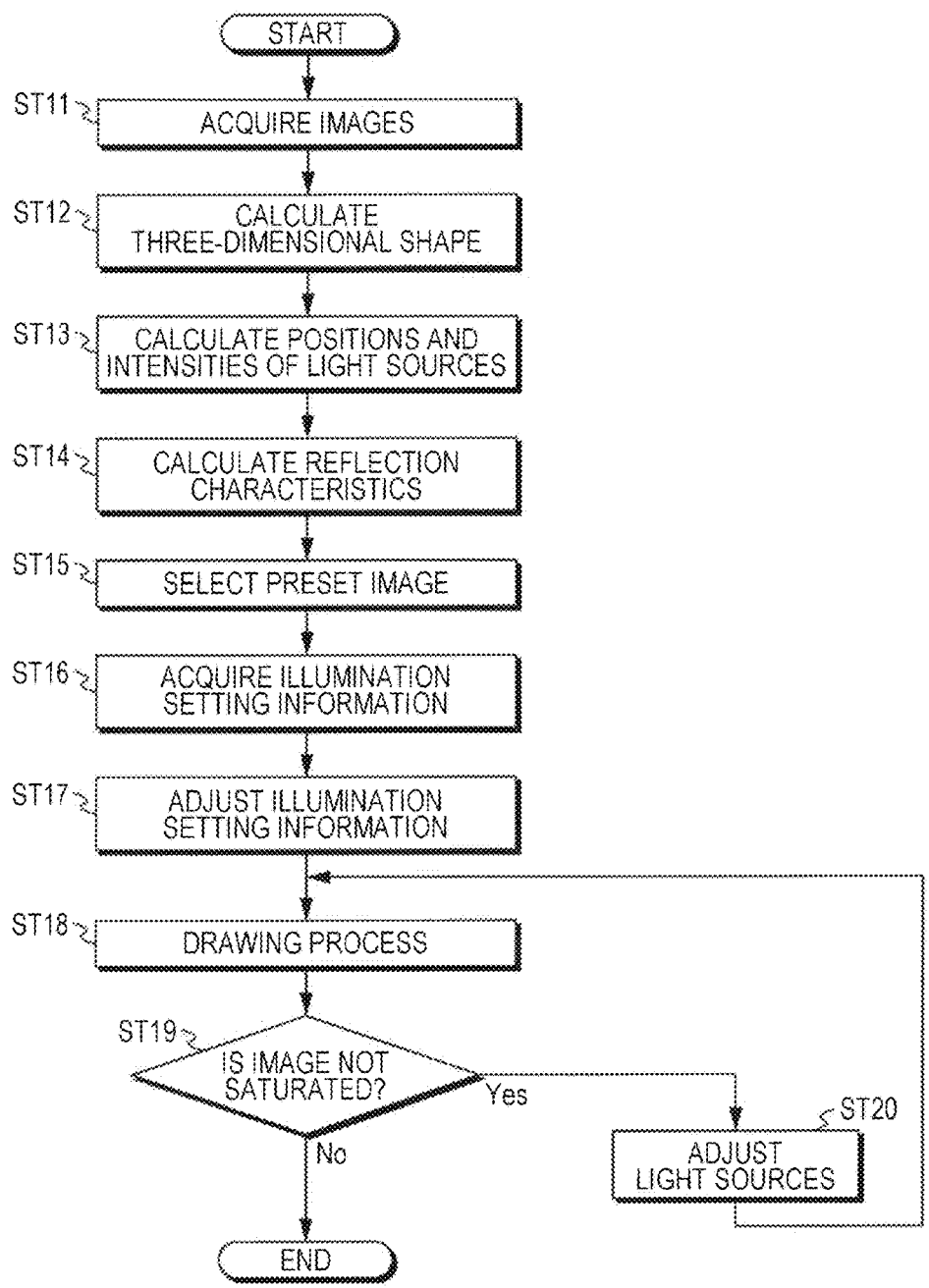
FIG. 15 is a flowchart of an operation in the second embodiment.

Next, an operation in the second embodiment will be explained. FIG. 15 is a flowchart of the operation in the second embodiment.

At step ST11, the image processing apparatus 10 acquires images. Specifically, the image acquisition unit 11 of the image processing apparatus 10 acquires the images from which the three-dimensional shape of the subject, the reflection characteristics of the subject, and the positions of the light sources can be estimated. The image acquisition unit 11 acquires the taken images acquired by the stereo cameras or the taken images acquired by the stereo cameras and recorded in a recording medium, and the like, for example. The image acquisition unit 11 then moves to step ST12. Note that, the image acquisition unit 11 may acquire these images via a network or the like.

At step ST12, the image processing apparatus 10 calculates the three-dimensional shape of the subject. Specifically, the subject information acquisition unit 12 of the image processing apparatus 10 uses the images acquired by the image acquisition unit 11 to calculate the parallaxes of the pixels of the subject, for example, and determine the depths corresponding to the pixel positions on the basis of the parallaxes, thereby calculating the three-dimensional shape of the imaged subject. The image processing apparatus 10 then moves to step ST13.

At step ST13, the image processing apparatus 10 calculates the positions and intensities of the light sources relative to the subject. Specifically, the subject information acquisition unit 12 of the image processing apparatus 10 estimates the positions of the light sources on the basis of bright spots on a spherical mirror seen in the taken images and calculates the colors and intensities of the light sources from the colors of the bright spots on the spherical mirror, for example. The image processing apparatus 10 calculates the positions and intensities of the light sources relative to the subject and then moves to step ST14.

At step ST14, the image processing apparatus 10 calculates the reflection characteristics of the subject. Specifically, the subject information acquisition unit 12 of the image processing apparatus 10 assumes a reflection model of an object in advance and calculates the reflection characteristics on the basis of the three-dimensional shape of the subject calculated at step ST12 and the positions and intensities of the light sources calculated at step ST13, for example. The image processing apparatus 10 then moves to step ST15.

At step ST15, the image processing apparatus 10 selects the preset image. Specifically, the preset image selection unit 22 of the image processing apparatus 10 selects the preset image from among the pre-stored preset images according to a user operation. The image processing apparatus 10 then moves to step ST16.

At step ST16, the image processing apparatus 10 acquires the illumination setting information. Specifically, the illumination setting information acquisition unit 23 of the image processing apparatus 10 acquires the illumination setting information, for example, the positions and intensities of the light sources from the preset image selected at step ST15. The illumination setting information acquisition unit 23 acquires three feature amounts from the preset image, that is, a three-dimensional structure of a rough scene, shadows in the subject, and reflection characteristics of the subject, for example. The illumination setting information acquisition unit 23 calculates the positions and intensities of the light sources using the acquired three-dimensional structure, and shadows and reflection characteristics of the subject, and then moves to step ST17.

At step ST17, the image processing apparatus 10 adjusts the illumination setting information. Specifically, the illumination setting information adjustment unit 31 of the image processing apparatus 10 adjusts the illumination setting information acquired at step ST16, for example, the positions and intensities of the light sources according to the three-dimensional shape of the imaged subject and the like, and then moves to step ST18.

At step ST18, the image processing apparatus 10 performs a drawing process. Specifically, the image generation unit 41 of the image processing apparatus 10 performs the drawing process as in the conventional manner on the basis of the taken images acquired at step ST11, the three-dimensional shape of the subject calculated at step ST12, the reflection characteristics calculated at step ST14, and the illumination setting information adjusted at step ST17. The image processing apparatus 10 performs the drawing process to generate the image in the changed illumination environment, and then moves to step ST19.

At step ST19, the image processing apparatus 10 determines whether there is no saturation in the image. Specifically, the illumination setting information adjustment unit 31 of the image processing apparatus 10 uses the image generated by the drawing process to calculate the color and brightness of the entire image. When determining that there is saturation in the brightness and the color on the basis of the calculation results of the color and brightness of the entire image, the image processing apparatus 10 moves to step ST20. When there is no saturation in the brightness and the color, the image processing apparatus 10 terminates the process.

At step ST20, the image processing apparatus 10 adjusts the light sources. Specifically, the illumination setting information adjustment unit 31 of the image processing apparatus 10 adjusts the light sources so as not to saturate the brightness and color of the image generated by the drawing process. For example, when the brightness is likely to be saturated, the illumination setting information adjustment unit 31 performs scaling of the intensities of the light sources such that the maximum brightness value of all the pixels matches with the maximum value of the image dynamic range. In addition, as for the color, the illumination setting information adjustment unit 31 also performs scaling of the intensities of the light sources. The image processing apparatus 10 adjusts the light sources in this manner and then returns to step ST18.

According to the second embodiment, the illumination environment is automatically set according to the preset information selected by the user and the imaged subject. Therefore, the image processing apparatus facilitates setting of the illumination environment for relighting. Accordingly, by simply selecting desired preset information, the user can obtain an image as if it was acquired in the desired illumination environment.

In addition, in the second embodiment, the illumination setting information is generated from the preset image, thereby eliminating the need to generate in advance the preset information from the information on the light sources and others as in the first embodiment. Therefore, by simply pre-storing the preset image and selecting the preset image in the desired illumination environment, the user can obtain an image as if the subject was imaged in the illumination environment equivalent to that for the selected preset image.

3. Third Embodiment

Next, a third embodiment will be explained. In the third embodiment, for selection of the illumination setting information, metadata associated with the illumination setting information is displayed as setting selection images to select the illumination setting information corresponding to the metadata selected by the user. Note that, in the third embodiment, when the names of photographers are used as metadata, for example, the illumination setting information for regenerating the illumination environments to be used by the photographers with the names indicated by the metadata is stored in association with the metadata.

Figure 16:
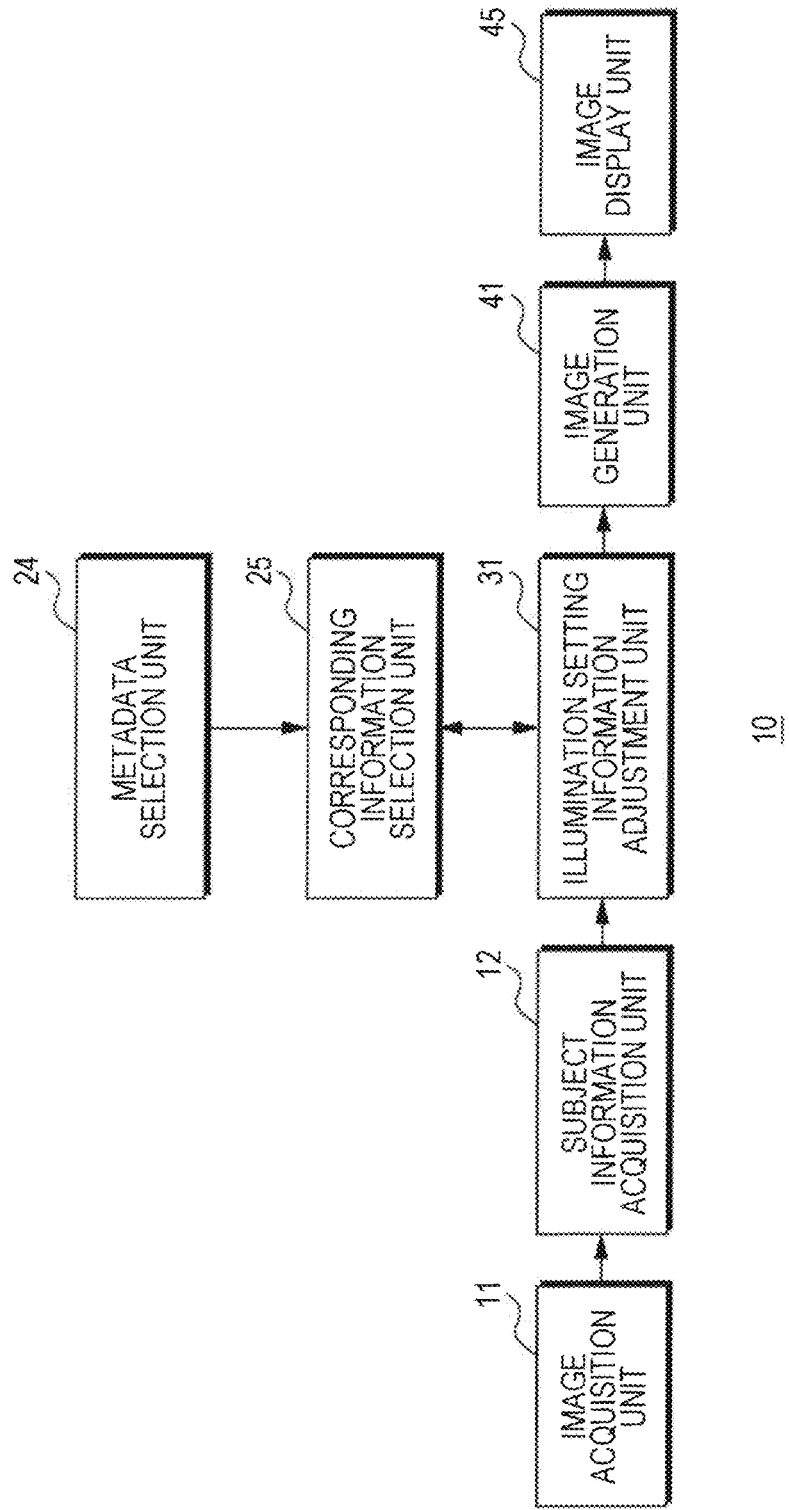
FIG. 16 is a diagram illustrating a configuration of an image processing apparatus of a third embodiment.

FIG. 16 is a diagram illustrating a configuration of an image processing apparatus of a third embodiment. An image processing apparatus 10 includes an image acquisition unit 11, a subject information acquisition unit 12, a metadata selection unit 24, an association information selection unit 25, an illumination setting information adjustment unit 31, an image generation unit 41, and an image display unit 45. Note that, the metadata selection unit 24 and the association information selection unit 25 are equivalent to the illumination setting information selection unit.

The image acquisition unit 11 acquires images from which the three-dimensional shape of a subject, the reflection characteristics of the subject, and the positions of light sources can be estimated. For example, to determine the depths corresponding to the pixel positions on the basis of parallaxes for estimation of the three-dimensional shape of the subject by the subject information acquisition unit 12, the image acquisition unit 11 acquires taken images of the subject by a pair of cameras (so-called stereo cameras) under the same specifications aligned horizontally at a known space therebetween. In addition, to estimate the positions of the light sources by the subject information acquisition unit 12, the image acquisition unit 11 uses bright spots in different positions generated on spherical surfaces in a right-viewpoint image and a left-viewpoint image acquired by the stereo cameras. In this case, the image acquisition unit 11 acquires the taken images of the subject including the spherical mirror within the imaging ranges of the stereo cameras. Note that, the image acquisition unit 11 may be configured to read the taken images acquired by the stereo cameras from a recording medium, or may be configured to acquire data on the taken images as described above from an external device via a network or the like.

The subject information acquisition unit 12 acquires the imaged subject information from the taken images acquired by the image acquisition unit 11, for example, the subject shape information and the reflection characteristic information. The subject information acquisition unit 12 calculates the parallaxes of the pixels of the subject seen in the stereo cameras, for example, and determines the depths corresponding to the pixel positions on the basis of the parallaxes, thereby acquiring the subject shape information. The subject information acquisition unit 12 also determines the light source information, for example, the positions, intensities, colors, and the like of the light sources, using the bright spots on the spherical mirror included in the taken images obtained by the stereo cameras, for example. The subject information acquisition unit 12 further acquires the reflection characteristic information indicative of the reflection characteristics of the imaged subject on the basis of the subject shape information and the light source information.

In addition, the subject information acquisition unit 12 acquires imaging mode information from the taken images acquired by the image acquisition unit 11. The subject information acquisition unit 12 determines in what imaging mode the taken images were acquired with the use of the imaged subject information or the like to acquire the imaging mode information. For example, the subject information acquisition unit 12 determines the imaging mode as portrait mode when the subject is a person, and determines the imaging mode as macro mode when the subject is a flower.

The metadata selection unit 24 selects the metadata according to a user operation. The metadata selection unit 24 allows the user to select metadata associated with the illumination setting information stored in advance in the association information selection unit 25. For example, in the case of using the names of photographers as metadata as described above, the association information selection unit 25 stores in advance the illumination setting information for regenerating the illumination environments to be used by the photographers with the names indicated by the metadata. The metadata selection unit 24 outputs the metadata selected by the user to the association information selection unit 25.

The association information selection unit 25 selects the illumination setting information corresponding to the metadata supplied from the metadata selection unit 24 and outputs the same to the illumination setting information adjustment unit 31. In addition, when the illumination setting information is provided for each imaging mode information, the association information selection unit 25 outputs to the illumination setting information adjustment unit 31 the illumination setting information corresponding to the imaging mode information acquired by the subject information acquisition unit 12 out of the illumination setting information corresponding to the metadata.

In this manner, to select the illumination setting information corresponding to the imaging mode information from among the illumination setting information corresponding to the metadata, the association information selection unit 25 stores in advance the illumination setting information with elements indicative of the metadata (for example, the names of photographers) added to the preset information shown in FIG. 7. In addition, the association information selection unit 25 may select the illumination setting information in which the imaging mode for the subject matches with that in the metadata, from among the stored illumination setting information. Note that, the illumination setting information may be acquired selectively via a network from among the illumination setting information stored in an external device. Alternatively, new illumination setting information may be added to the association information selection unit 25 via a network or a recording medium.

Figure 17:
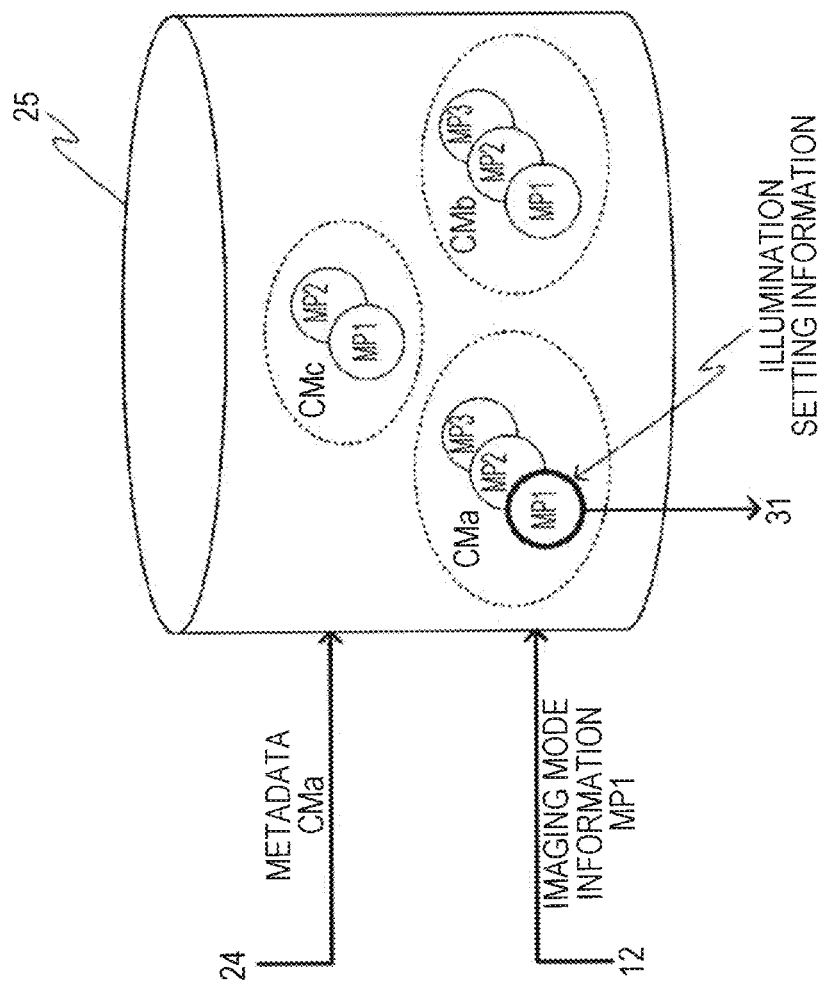
FIG. 17 is a diagram describing selection of the illumination setting information.

FIG. 17 is a diagram describing selection of the illumination setting information. A database 251 provided in the association information selection unit 25 stores the illumination setting information in each imaging mode for each photographer. For example, for a photographer CMa, illumination setting information in imaging modes MP1 to MP3 (shown by circles) is stored. Similarly, for a photographer CMb, illumination setting information in the imaging modes MP1 to MP3 is stored, and for a photographer CMc, illumination setting information in the imaging modes MP1 and MP2 is stored.

For example, the imaging mode information acquired by the subject information acquisition unit 12 is "imaging mode MP1," and the metadata selected by the user with the metadata selection unit 24 is "photographer CMa." in this case, the association information selection unit 25 selects the illumination setting information in the imaging mode MP1 (shown by a thick circle) from among the illumination setting information for the photographer CMa, and outputs the same to the illumination setting information adjustment unit 31.

The illumination setting information adjustment unit 31 adjusts the illumination setting information supplied from the metadata selection unit 24 according to the imaged subject. In addition, the illumination setting information adjustment unit 31 or the image generation unit performs a drawing process on the basis of the illumination setting information after the adjustment. As described above, the subject information acquisition unit 12 acquires the subject shape information and the reflection characteristic information. In addition, the illumination setting information adjustment unit 31 adjusts the illumination setting information related to the metadata selected by the user according to the imaged subject. Therefore, the drawing is performed in a manner similar to the conventional computer graphics using the subject shape information and the reflection characteristics acquired by the subject information acquisition unit 12, the illumination setting information adjusted by the illumination setting information adjustment unit 31, and the like.

The illumination setting information adjustment unit 31 further uses the image generated by the drawing process to calculate the color and brightness of the entire image. When determining that the brightness and color of the entire image are saturated, the illumination setting information adjustment unit 31 adjusts the intensities of the light sources so as not to saturate the brightness and the color.

The image generation unit 41 performs a drawing process. The image generation unit 41 performs the drawing process on the basis of the taken images acquired by the image acquisition unit 11, the imaged subject information acquired by the subject information acquisition unit 12, and the illumination setting information after the adjustment supplied from the illumination setting information adjustment unit 31. By performing the drawing process, the image generation unit 41 generates the taken image in the illumination environment obtained by adjusting the illumination environment at the time of generation of the selected preset image on the basis of the imaged subject, and outputs the same to the image display unit 45.

The image display unit 45 displays the images generated by the image generation unit on the screen. In addition, the image display unit 45 is associated with the metadata selection unit 24, and may display metadata selectable by the metadata selection unit 24. For example, a user operation input means such as a touch panel is provided on the screen of the image display unit 45 to allow the user to select any of the metadata displayed on the screen of the image display unit 45. Alternatively, the metadata selection unit 24 may be provided with an image display function to display metadata selectable by the metadata selection unit 24.

Figure 18:
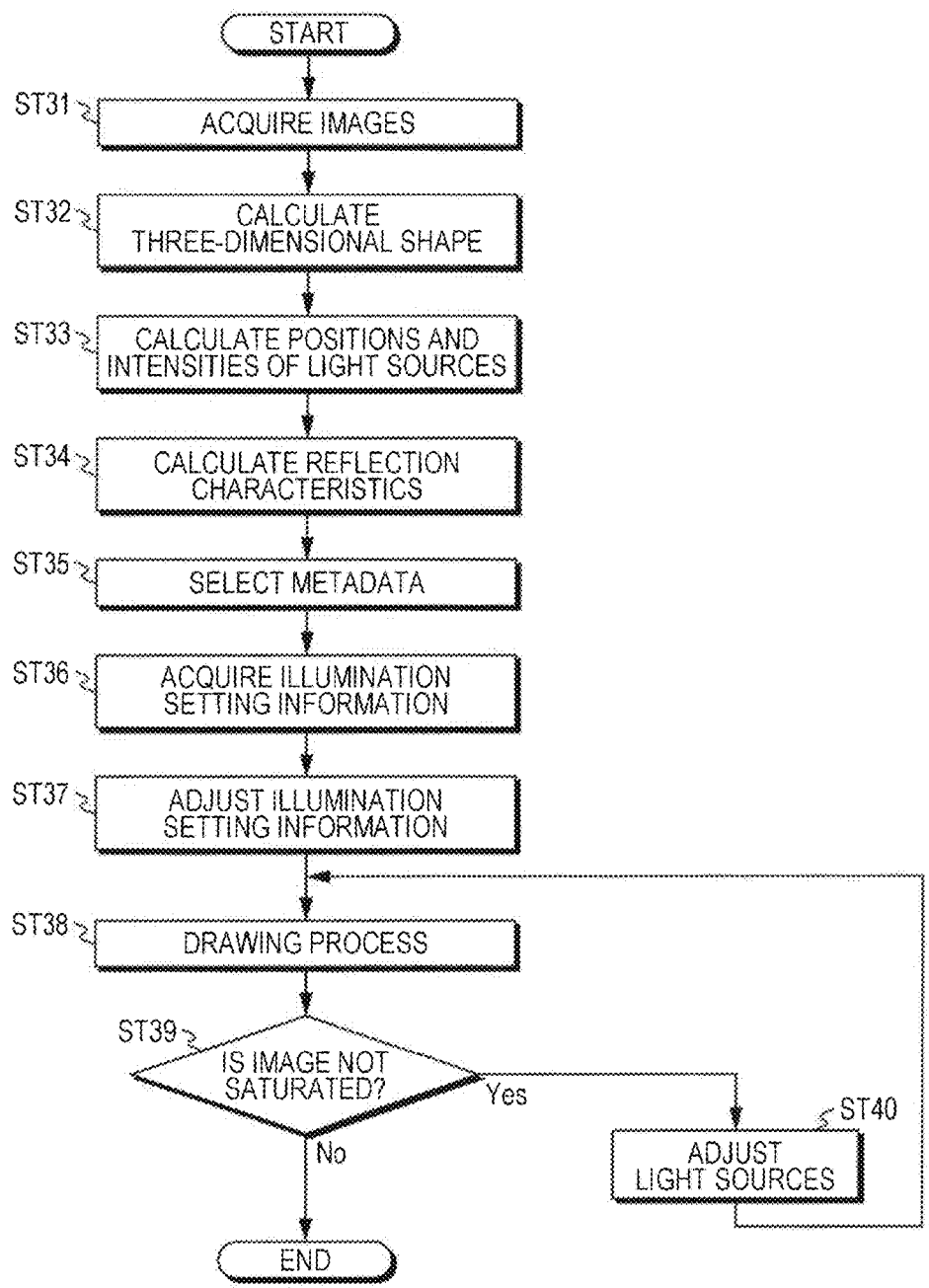
FIG. 18 is a flowchart of an operation in the third embodiment.

Next, an operation in the third embodiment will be explained. FIG. 18 is a flowchart of the operation in the third embodiment.

At step ST31, the image processing apparatus 10 acquires images. Specifically, the image acquisition unit 11 of the image processing apparatus 10 acquires the images from which the three-dimensional shape of the subject, the reflection characteristics of the subject, and the positions of the light sources can be estimated. The image acquisition unit 11 acquires the taken images acquired by the stereo cameras or the taken images acquired by the stereo cameras and recorded in a recording medium, and the like, for example.

The image acquisition unit 11 then moves to step ST32. Note that, the image acquisition unit 11 may acquire these images via a network or the like.

At step ST32, the image processing apparatus 10 calculates the three-dimensional shape of the subject. Specifically, the subject information acquisition unit 12 of the image processing apparatus 10 uses the images acquired by the image acquisition unit 11 to calculate the parallaxes of the pixels of the subject, for example, and determine the depths corresponding to the pixel positions on the basis of the parallaxes, thereby calculating the three-dimensional shape of the imaged subject. The image processing apparatus 10 then moves to step ST33.

At step ST33, the image processing apparatus 10 calculates the positions and intensities of the light sources relative to the subject. Specifically, the subject information acquisition unit 12 of the image processing apparatus 10 estimates the positions of the light sources on the basis of bright spots on a spherical mirror seen in the taken images and calculates the colors and intensities of the light sources from the colors of the bright spots on the spherical mirror, for example. The image processing apparatus 10 calculates the positions and intensities of the light sources relative to the subject and then moves to step ST34.

At step ST34, the image processing apparatus 10 calculates the reflection characteristics of the subject. Specifically, the subject information acquisition unit 12 of the image processing apparatus 10 assumes a reflection model of an object in advance, and calculates the reflection characteristics on the basis of the three-dimensional shape of the subject calculated at step ST32 and the positions and intensities of the light sources calculated at step ST33, for example. The image processing apparatus 10 then moves to step ST35.

At step ST35, the image processing apparatus 10 selects metadata. Specifically, the metadata selection unit 24 of the image processing apparatus 10 selects the metadata from among the pre-stored metadata according to a user operation, and then moves to step ST36.

At step ST36, the image processing apparatus 10 selects the illumination setting information. Specifically, the association information selection unit 25 of the image processing apparatus 10 selects the illumination setting information associated with the metadata selected at step ST35 as the illumination setting information for use in the relighting process, and then moves to step ST37. Note that, for the selection of the illumination setting information, the imaging mode information acquired by the subject information acquisition unit 12 may be further used to select the illumination setting information in which the imaging mode matches with the imaging mode indicated by the imaging mode information.

At step ST37, the image processing apparatus 10 adjusts the illumination setting information. Specifically, the illumination setting information adjustment unit 31 of the image processing apparatus 10 adjusts the illumination setting information acquired at step ST36 according to the three-dimensional shape of the imaged subject and the like, and then moves to step ST38.

At step ST38, the image processing apparatus 10 performs a drawing process. Specifically, the image generation unit 41 of the image processing apparatus 10 performs the drawing process as in the conventional manner on the basis of the taken images acquired at step ST31, the three-dimensional shape of the subject calculated at step ST32, the reflection characteristics calculated at step ST34, and the illumination setting information adjusted at step ST37. The image processing apparatus 10 performs the drawing process to generate the image in the changed illumination environment, and then moves to step ST39.

At step ST39, the image processing apparatus 10 determines whether there is no saturation in the image. Specifically, the illumination setting information adjustment unit 31 of the image processing apparatus 10 uses the image generated by the drawing process to calculate the color and brightness of the entire image. When determining that there is saturation in the brightness and the color on the basis of the calculation results of the color and brightness of the entire image, the image processing apparatus 10 moves to step ST40. When there is no saturation in the brightness and the color, the image processing apparatus 10 terminates the process.

At step ST40, the image processing apparatus 10 adjusts the light sources. Specifically, the illumination setting information adjustment unit 31 of the image processing apparatus 10 adjusts the light sources so as not to saturate the brightness and color of the image generated by the drawing process. For example, when the brightness is likely to be saturated, the illumination setting information adjustment unit 31 performs scaling of the intensities of the light sources such that the maximum brightness value of all the pixels matches with the maximum value of the image dynamic range. In addition, as for the color, the illumination setting information adjustment unit 31 also performs scaling of the intensities of the light sources. The image processing apparatus 10 adjusts the light sources in this manner and then returns to step ST38.

According to the third embodiment, the illumination environment is automatically set according to the metadata selected by the user and the imaged subject. Therefore, the image processing apparatus facilitates setting of the illumination environment for relighting. Accordingly, by simply selecting desired metadata, the user can obtain an image as if it was acquired in the desired illumination environment.

In addition, in the third embodiment, the metadata and the illumination setting information are stored in association with each other. Therefore, by simply selecting the metadata indicative of the desired photographer's name, the user can obtain an image as if the subject was imaged in the illumination environment used by the desired photographer.

In addition, in the third embodiment, the photographers' names are used as metadata. Alternatively, words or the like indicative of impressions of the generated images may be displayed such that the illumination setting information corresponding to the words indicative of the impressions is stored in association with the words.

4. Another Embodiment

In the foregoing embodiments, the illumination setting information is selected according to the user's selection operation on the preset information, the preset image, or the metadata. The metadata may be superimposed on the images of the preset information and displayed. For example, the imaging mode information or the words or the like indicative of the impressions of the generated images are superimposed on the images of the preset information and displayed. Alternately, the metadata based on the positions and intensities of the light sources extracted from the preset images may be superimposed on the preset images and displayed. For example, when the positions and intensities of the light sources are similar to those in the portrait imaging mode, the imaging mode information (portrait) is superimposed on the preset images and displayed. In this manner, displaying the preset information, the preset images, or the metadata in combination allows the user to easily select the desired illumination environment.

In addition, in the case where a large number of preset information and preset images is defined, the imaging mode of the subject is identified, and the preset information or the preset images including the imaging mode information matching with the identified imaging mode are suggested to the user on a priority basis. In this manner, controlling the order of suggestion of the preset information or the preset images with the use of the imaging mode information allows the user to easily select the desired preset information or preset image.

As described above, according to this technology, when relighting is to be performed on the imaged subject, it is possible to generate automatically the illumination setting information according to the user's selection operation of the preset information, the preset image, or the metadata. Therefore, without any professional know-how or equipment, a general user can generate an image in a very easy manner as if it was acquired in a desired favorable illumination environment. In addition, the selection and adjustment of the illumination setting information for use in the relighting process are also applicable to editing of general computer graphic models, and therefore the user can edit computer graphic models in an easy manner without special expertise or tool.

Note that, the method for acquiring the imaged subject information from the taken image and the method for acquiring the illumination setting information from the preset image are not limited to the foregoing methods but may be any other method.

In addition, the series of processes explained herein can be executed by hardware, software, or a combination of the both. To execute the process by software, a program recording a process sequence is installed into a memory of a computer incorporated in dedicated hardware and executed. Alternatively, the program may be installed into a general-purpose computer capable of executing various processes and executed.

For example, the program can be recorded in advance in a hard disk, a solid state drive (SSD), or a read only memory (ROM) as recording media. Alternatively, the program can be stored (recorded) temporarily or permanently in removable recording media such as a flexible disk, a compact disc read only memory (CD-ROM), a magneto optical (MO) disc, a digital versatile disc (DVD), a Blu-Ray disc (BD) (registered trademark), a magnet disk, and a semiconductor memory card. The removable recording media can be provided as so-called packaged software.

In addition, the program may be installed from a removable recording medium into a computer or may be transferred from a download site to a computer in a wireless or wired manner over a network such as a local area network (LAN) or the Internet. The computer can receive the program transferred in such a manner and install the same into a recording medium such as an internal hard disk.

Note that, the present technology is not to be limited to the foregoing embodiments. The embodiments of this technology are intended to disclose the present technology in the form of exemplification. Accordingly, it is obvious that those skilled in the art can modify the embodiments or substitute any other embodiment for the embodiment without deviating from the gist of the present technology. That is, to assess the gist of the present technology, the claims should be referred to.

In addition, the image processing apparatus of the present technology can also be configured as follows:

(1) An image processing apparatus including:
a subject information acquisition unit that acquires imaged subject information indicative of attributes related to illumination for a subject from a taken image;
an illumination setting information selection unit that selects illumination setting information according to a user operation; and
an illumination setting information adjustment unit that adjusts the illumination setting information selected by the illumination setting information selection unit to illumination setting information corresponding to the subject on the basis of the imaged subject information acquired by the subject information acquisition unit.

(2) The image processing apparatus according to (1), wherein the subject information acquisition unit acquires three-dimensional shape and reflection characteristics of the subject as the imaged subject information from the taken image.

(3) The image processing apparatus according to (1) or (2), wherein
the illumination setting information is generated using a preset coordinate system, and
the coordinate system is brought into correspondence with the subject to adjust the illumination setting information to the illumination setting information corresponding to the subject.

(4) The image processing apparatus according to (3), wherein the illumination setting information includes light source information including information on placement of a light source and illumination light and reference subject information including information on size and placement of a reference subject illuminated by the light source indicated by the light source information.

(5) The image processing apparatus according to (4), wherein the illumination setting information adjustment unit brings the coordinate system into correspondence with the subject such that the size and placement of the reference subject match with those of the subject in the taken image.

(6) The image processing apparatus according to any of (1) to (5), wherein the illumination setting information adjustment unit adjusts the illumination setting information such that a subject image obtained by performing a drawing process with the use of the imaged subject information and the illumination setting information after the adjustment does not become saturated.

(7) The image processing apparatus according to any of (1) to (6), wherein the illumination setting information selection unit displays setting selection images associated with the illumination setting information, and sets the illumination setting information corresponding to the setting selection image selected by the user as the selected illumination setting information.

(8) The image processing apparatus according to (7), wherein the illumination setting information selection unit displays preset information based on the illumination setting information as the setting selection images, and selects the illumination setting information corresponding to the preset information selected by the user.

(9) The image processing apparatus according to (7), wherein the illumination setting information selection unit displays preset images as the setting selection images, and acquires the illumination setting information from the preset image selected by the user.

(10) The image processing apparatus according to (7), wherein the illumination setting information selection unit displays metadata associated with the illumination setting information as the setting selection images, and selects the illumination setting information corresponding to the metadata selected by the user.

(11) The image processing apparatus according to any of (1) to (10), wherein
the subject information acquisition unit acquires imaging mode information for the subject, and
the illumination setting information selection unit selects the illumination setting information having imaging mode information matching with the imaging mode information acquired by the subject information acquisition unit.

(12) The image processing apparatus according to any of (1) to (11), further comprising an image generation unit that performs a drawing process on the basis of the imaged subject information acquired by the subject information acquisition unit and the illumination setting information adjusted by the illumination setting information adjustment unit.

(13) The image processing apparatus according to any of (1) to (12), further comprising an image acquisition unit that acquires images of the subject taken from different viewpoint positions as the taken images.

INDUSTRIAL APPLICABILITY

According to the image processing apparatus and the image processing method of this technology, the subject information acquisition unit acquires the subject information indicative of the attributes related to illumination for the subject from the taken images. In addition, the illumination setting information selection unit selects the illumination setting information according to a user operation. The illumination setting information adjustment unit adjusts the selected illumination setting information to the illumination setting information corresponding to the subject on the basis of the subject information. That is, when the user selects the illumination setting information, the selected illumination setting information is adjusted to the illumination setting information corresponding to the subject. Accordingly, it is possible to perform a drawing process using the illumination setting information after the adjustment to generate the image as if it was acquired in the desired illumination environment, thereby facilitating setting of an illumination environment for relighting. Therefore, this technology is suitable for electronic devices with an imaging function, electronic devices for editing taken images, and others.

REFERENCE SIGNS LIST

10 Image processing apparatus
11 Image acquisition unit
12 Subject information acquisition unit
21 Preset information selection unit
22 Preset image selection unit
23 Illumination setting information acquisition unit
24 Metadata selection unit
25 Association information selection unit
31 Illumination setting information adjustment unit
41 Image generation unit
45 Image display unit

The invention claimed is:

1. An image processing apparatus comprising:
   circuitry configured to:
      acquire imaged subject information indicative of attributes related to illumination for a subject from a taken image;
      select illumination setting information generated using a preset coordinate system according to a user operation; and
      adjust the selected illumination setting information to illumination setting information corresponding to the subject on the basis of the acquired imaged subject information,
   wherein the circuitry adjusts the selected illumination setting information by setting a direction of coordinate axes according to the subject on the basis of a three-dimensional shape of the subject and adjusting coordinate axes in the preset coordinate system by bringing the coordinate axes in the preset coordinate system into correspondence with the coordinate axes according to the subject.

2. The image processing apparatus according to claim 1, wherein the circuitry is further configured to:
   acquire three-dimensional shape and reflection characteristics of the subject as the imaged subject information from the taken image.

3. The image processing apparatus according to claim 1, wherein
   the preset coordinate system is brought into correspondence with the subject to adjust the illumination setting information to the illumination setting information corresponding to the subject.

4. The image processing apparatus according to claim 3, wherein the illumination setting information includes light source information including information on placement of a light source and illumination light and reference subject information including information on size and placement of a reference subject illuminated by the light source indicated by the light source information.

5. The image processing apparatus according to claim 4, wherein the circuitry is further configured to:
   bring the preset coordinate system into correspondence with the subject such that the size and placement of the reference subject match with those of the subject in the taken image.

6. The image processing apparatus according to claim 1, wherein the circuitry is further configured to:
   adjust the illumination setting information such that a subject image obtained by performing a drawing process with use of the imaged subject information and the illumination setting information after the adjustment does not become saturated.

7. The image processing apparatus according to claim 1, wherein the circuitry is further configured to:
   initiate display of setting selection images associated with the illumination setting information, and set the illumination setting information corresponding to the setting selection image selected by the user as the selected illumination setting information.

8. The image processing apparatus according to claim 7, wherein the circuitry is further configured to:
   initiate display of preset information based on the illumination setting information as the setting selection images, and select the illumination setting information corresponding to the preset information selected by the user.

9. The image processing apparatus according to claim 7, wherein the circuitry is further configured to:
   initiate display of preset images as the setting selection images, and acquire the illumination setting information from the preset image selected by the user.

10. The image processing apparatus according to claim 7, wherein the circuitry is further configured to:
    initiate display of metadata associated with the illumination setting information as the setting selection images, and select the illumination setting information corresponding to the metadata selected by the user.

11. The image processing apparatus according to claim 1, wherein the circuitry is further configured to:
    acquire imaging mode information for the subject; and
    select the illumination setting information having imaging mode information matching with the acquired imaging mode information.

12. The image processing apparatus according to claim 1, wherein the circuitry is further configured to:
    perform a drawing process on the basis of the acquired imaged subject information and the adjusted illumination setting information.

13. The image processing apparatus according to claim 1, wherein the circuitry is further configured to:
    acquire images of the subject taken from different viewpoint positions as the taken images.

14. An image processing method comprising:
    acquiring imaged subject information indicative of attributes related to illumination for a subject from a taken image;
    selecting illumination setting information generated using a preset coordinate system according to a user operation; and
    adjusting the illumination setting information to illumination setting information corresponding to the subject on the basis of the imaged subject information,
    wherein the adjusting the illumination setting information to illumination setting information corresponding to the subject on the basis of the imaged subject information comprises setting a direction of coordinate axes according to the subject on the basis of a three-dimensional shape of the subject and adjusting coordinate axes in the preset coordinate system by bringing the coordinate axes in the preset coordinate system into correspondence with coordinate axes according to the subject.

15. The image processing apparatus according to claim 1, wherein the circuitry is further configured to:
    match a central position of the preset coordinate system to a barycenter of the subject.

16. The image processing apparatus according to claim 4, wherein the circuitry is further configured to:
    perform scaling such that a radius of a sphere circumscribing the reference subject defined in the preset information corresponds to the size of the subject.

17. A non-transitory computer-readable medium having embodied thereon a program, which when executed by a computer causes the computer to execute a method, the method comprising:
    acquiring imaged subject information indicative of attributes related to illumination for a subject from a taken image;
    selecting illumination setting information generated using a preset coordinate system according to a user operation; and
    adjusting the illumination setting information to illumination setting information corresponding to the subject on the basis of the imaged subject information, wherein the adjusting the illumination setting information to illumination setting information corresponding to the subject on the basis of the imaged subject information comprises setting a direction of coordinate axes according to the subject on the basis of a three-dimensional shape of the subject and adjusting coordinate axes in the preset coordinate system by bringing the coordinate axes in the preset coordinate system into correspondence with coordinate axes according to the subject.

18. The image processing apparatus according to claim 4, wherein the circuitry is further configured to:
adjust the information on the light sources according to the adjusted preset coordinate system.

19. The image processing apparatus according to claim 1, wherein the circuitry is further configured to:
when the subject is an object, set, as the coordinate axes according to the subject, a front side of the object, a vertically upward direction, and a vector orthogonal to the front side of the object and the vertically upward direction; and
when the subject is a scenic image imaged by a camera, set, as the coordinate axes according to the subject, a front side of the camera, a vertically upward direction, and a vector orthogonal to the front side of the camera and the vertically upward direction.

20. The image processing apparatus according to claim 19, wherein the circuitry is further configured to:
when the subject is an object, set the front side of the object as a reference coordinate axis zr in the preset coordinate system, the vertically upward direction as a reference coordinate axis yr in the preset coordinate system, and the vector orthogonal to the front side of the object and the vertically upward direction as a reference coordinate axis xr in the preset coordinate system; and
when the subject is the scenic image, set the front side of the camera as a reference coordinate axis zr in the preset coordinate system, the vertically upward direction as a reference coordinate axis yr in the preset coordinate system, and the vector orthogonal to the front side of the camera and the vertically upward direction as a reference coordinate axis xr in the preset coordinate system.

\* \* \* \* \*